(12) United States Patent
Ang et al.

(10) Patent No.: US 11,032,001 B2
(45) Date of Patent: Jun. 8, 2021

(54) TIMING PARAMETER MANAGEMENT FOR BANDWIDTH PART SWITCHING

(71) Applicant: QUALCOMM incorporated, San Diego, CA (US)

(72) Inventors: Peter Pui Lok Ang, San Diego, CA (US); Peter Gaal, San Diego, CA (US); Alexei Yurievitch Gorokhov, San Diego, CA (US); Tingfang Ji, San Diego, CA (US); Tao Luo, San Diego, CA (US); Heechoon Lee, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/373,512

(22) Filed: Apr. 2, 2019

(65) Prior Publication Data

US 2019/0312635 A1  Oct. 10, 2019

Related U.S. Application Data

(60) Provisional application No. 62/653,510, filed on Apr. 5, 2018.

(51) Int. Cl.

| | |
|---|---|
| *H04B 7/216* | (2006.01) |
| *H04B 7/26* | (2006.01) |
| *H04B 7/005* | (2006.01) |
| *H04B 7/0413* | (2017.01) |

(52) U.S. Cl.
CPC ........... *H04B 7/2668* (2013.01); *H04B 7/005* (2013.01); *H04B 7/2634* (2013.01); *H04B 7/0413* (2013.01)

(58) Field of Classification Search
CPC ..................... H04L 15/0098; H04B 7/2634
See application file for complete search history.

(56) References Cited

U.S. PATENT DOCUMENTS

| | | | | |
|---|---|---|---|---|
| 2018/0183551 | A1* | 6/2018 | Chou | .................. H04W 72/042 |
| 2019/0215777 | A1* | 7/2019 | Kang | .................... H04W 52/08 |

OTHER PUBLICATIONS

International Search Report and Written Opinion—PCT/US2019/025554—ISA/EPO—dated Jun. 24, 2019 (182837WO).

(Continued)

*Primary Examiner* — Bo Hui A Zhu
(74) *Attorney, Agent, or Firm* — Qualcomm Incorporated

(57) ABSTRACT

Bandwidth part (BWP) switching may benefit a wireless communications system. Such BWP switching may include indication of one or more timing parameters used for time domain resource allocation. For example, the timing parameters may be indicated based on an index to a look-up table (e.g., a bit field in a control transmission). In some cases, one or more tables may be configured for a given BWP, and different tables may contain a different number of rows. The size of the bit field indexing the table may in turn depend on the number of rows. When switching from a first BWP to a second BWP, the size of the bit field may be based on the table of the first BWP, but the bit field may index the table of the second BWP. Techniques supporting improved timing parameter management during BWP switching are discussed herein.

40 Claims, 17 Drawing Sheets

(56) References Cited

OTHER PUBLICATIONS

LG Electronics: "Remaining Issues on Bandwidth Part Operation" 3GPP Draft; R1-1800384, vol. RAN WG1, No. Vancouver, Canada; Jan. 2, 2018-Jan. 26, 2018, Jan. 13, 2018 (Jan. 13, 2018), 14 Pages, XP051384839, Retrieved from the Internet: URL: https://www.3gpp.org/ftp/tsg_ran/WG1_RL1/TSGR1_AH/NR_AH_1801/Docs/ [retrieved on 2818-81-13], Sections 1-4.

Qualcomm Incorporated: "Remaining Issues on BWP", 3GPP Draft; R1-1802844, vol. RAN WG1, No. Athens, Greece; Feb. 26, 2018-Mar. 2, 2018, Feb. 17, 2018 (Feb. 17, 2018), pp. 1-24, XP051398257, Retrieved from the Internet: URL: http://www.3gpp.org/ftp/tsg_ran/WG1_RL1/TSGR1_92/Docs [retrieved on Feb. 17, 2018], Sections 1-3.

\* cited by examiner

TIMING PARAMETER MANAGEMENT FOR BANDWIDTH PART SWITCHING

CROSS REFERENCE

The present application for patent claims the benefit of U.S. Provisional Patent Application No. 62/653,510 by ANG, et al., entitled "Timing Parameter Management For Bandwidth Part Switching," filed Apr. 5, 2018, assigned to the assignee hereof, and expressly incorporated by reference herein in its entirety.

BACKGROUND

The following relates generally to wireless communication, and more specifically to timing parameter management for bandwidth part switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

In some wireless communications systems, wireless devices may operate within different portions of a channel or carrier. For example, a UE may operate in one or more bandwidth parts (BWPs) of a channel used for wireless communications. In such cases, the UE may be capable of switching between different BWPs, for example, to conserve energy by tuning a radio to a smaller BWP (e.g., as compared to other BWPs). Switching between these respective BWPs may be controlled through downlink signaling, such as downlink control information (DCI), which may enable various schemes for resource assignments and for triggering of BWP switching. As a result, techniques that support efficient BWP switching may be desired.

SUMMARY

The described techniques relate to improved methods, systems, devices, and apparatuses that support timing parameter management for bandwidth part switching. Generally, the described techniques provide considerations for time-domain resource allocation associated with bandwidth part (BWP) switching. For example, a device (e.g., a user equipment (UE)) may be configured to support one or more BWPs (e.g., via radio resource control (RRC) signaling). A BWP may, for example, allow the UE to operate within a smaller frequency range (e.g., compared to a component carrier bandwidth). In some cases, a UE may be configured with multiple BWPs with different frequency locations, bandwidths, numerologies (e.g., communication parameters), combinations thereof, etc. Because of the differences between the configured BWPs, ambiguity may arise during or following a BWP switch. For example, a UE may be triggered (e.g., via downlink control information (DCI) received from a base station) to switch from a first BWP to a second BWP. In some cases, the DCI indicating the switch may be formatted based at least in part on the first BWP, which may constrain its flexibility when applied to the second BWP, meaning, for example, when a format of the DCI corresponding to the first BWP is used to indicate a parameter value associated with the second BWP.

By way of example, the second BWP may be associated with a table (e.g., a timing parameter table) that is larger than a corresponding table associated with the first BWP. In some cases, the DCI indicating the switch may contain a bit-field that is sized according to the first BWP table. For example, if the first BWP table contains four rows, the bit-field may be a two-bit long field for indexing the rows. However, if the second BWP table differs in size from the first BWP table, difficulties in indexing rows of the second BWP table may arise. For example, if the second BWP table contains eight rows, only the first four may be addressable by the two-bit long field in the DCI. Considerations for efficient BWP switching are described herein. Such considerations include layouts of the BWP tables (e.g., the timing parameter tables), DCI formats, and timing considerations, among others.

A method of wireless communication is described. The method may include identifying a set of timing parameter tables that each define one or more potential values for a timing parameter associated with a timing between receipt, from a base station, of DCI and a subsequent communication with the base station according to the DCI, the set of timing parameter tables including at least a first timing parameter table associated with a first BWP and a second timing parameter table associated with a second BWP, receiving, over the first BWP, a DCI transmission that activates the second BWP, the DCI transmission including a resource allocation bit field indexing at least a subset of the second timing parameter table, where a size of the resource allocation bit field is based on a configuration of the first BWP, identifying a value for the timing parameter based on the second timing parameter table and the size of the resource allocation bit field, and communicating with the base station over the second BWP in accordance with the value for the timing parameter.

An apparatus for wireless communication is described. The apparatus may include a processor, memory coupled with the processor, and instructions stored in the memory. The instructions may be executable by the processor to cause the apparatus to identifying a set of timing parameter tables that each define one or more potential values for a timing parameter associated with a timing between receipt, from a base station, of DCI and a subsequent communication with the base station according to the DCI, the set of timing parameter tables including at least a first timing parameter table associated with a first BWP and a second timing parameter table associated with a second BWP, receiving, over the first BWP, a DCI transmission that activates the second BWP, the DCI transmission including a resource allocation bit field indexing at least a subset of the second timing parameter table, where a size of the resource allocation bit field is based on a configuration of the first BWP, identifying a value for the timing parameter based on the second timing parameter table and the size of the resource allocation bit field, and communicating with the base station over the second BWP in accordance with the value for the timing parameter.

Another apparatus for wireless communication is described. The apparatus may include identifying a set of timing parameter tables that each define one or more potential values for a timing parameter associated with a timing between receipt, from a base station, of DCI and a subsequent communication with the base station according to the DCI, the set of timing parameter tables including at least a first timing parameter table associated with a first BWP and a second timing parameter table associated with a second BWP, receiving, over the first BWP, a DCI transmission that activates the second BWP, the DCI transmission including a resource allocation bit field indexing at least a subset of the second timing parameter table, where a size of the resource allocation bit field is based on a configuration of the first BWP, identifying a value for the timing parameter based on the second timing parameter table and the size of the resource allocation bit field, and communicating with the base station over the second BWP in accordance with the value for the timing parameter.

A non-transitory computer-readable medium storing code for wireless communication is described. The code may include instructions executable by a processor to identifying a set of timing parameter tables that each define one or more potential values for a timing parameter associated with a timing between receipt, from a base station, of DCI and a subsequent communication with the base station according to the DCI, the set of timing parameter tables including at least a first timing parameter table associated with a first BWP and a second timing parameter table associated with a second BWP, receiving, over the first BWP, a DCI transmission that activates the second BWP, the DCI transmission including a resource allocation bit field indexing at least a subset of the second timing parameter table, where a size of the resource allocation bit field is based on a configuration of the first BWP, identifying a value for the timing parameter based on the second timing parameter table and the size of the resource allocation bit field, and communicating with the base station over the second BWP in accordance with the value for the timing parameter.

In some examples of the method, apparatuses, and non-transitory computer-readable medium described herein, the first timing parameter table includes a first set of rows and the second timing parameter table includes a second set of rows, each row of the first set of rows and the second set of rows indicating a potential value for the timing parameter, and where the size of the resource allocation bit field may be based on a number of rows in the first set of rows.

In some examples of the method, apparatuses, and non-transitory computer-readable medium described herein, the first set of rows may include operations, features, means, or instructions for identifying a subset of bits in the resource allocation bit field, the subset of bits indexing a row of the second set of rows and determining the value for the timing parameter based on the indexed row of the second set of rows.

In some examples of the method, apparatuses, and non-transitory computer-readable medium described herein, the first set of rows may include operations, features, means, or instructions for identifying a subset of the second set of rows that may be addressable by the resource allocation bit field, identifying a row of the subset of the second set of rows indexed by the resource allocation bit field and determining the value for the timing parameter based on the indexed row.

In some examples of the method, apparatuses, and non-transitory computer-readable medium described herein, the subset of the second set of rows includes a lowest-indexed row of the second set of rows, the lowest-indexed row corresponding to a preferred value of the timing parameter for switching to the second BWP.

In some examples of the method, apparatuses, and non-transitory computer-readable medium described herein, the subset of the second set of rows includes a largest value of the potential values for the timing parameter from the second plurality of rows.

In some examples of the method, apparatuses, and non-transitory computer-readable medium described herein, the subset of the second set of rows includes at least one row corresponding to a preferred value of the timing parameter for communicating in the second BWP.

In some examples of the method, apparatuses, and non-transitory computer-readable medium described herein, the preferred value of the timing parameter includes a first value for wakeup communications, a second value for data communications, or a third value for micro-sleep communications.

In some examples of the method, apparatuses, and non-transitory computer-readable medium described herein, the first timing parameter table may be associated with uplink transmissions over the first BWP, the set of timing parameter tables further including a third timing parameter table associated with downlink transmissions over the first BWP.

In some examples of the method, apparatuses, and non-transitory computer-readable medium described herein, the first BWP may have a first tone spacing and the second BWP may have a second tone spacing, where the potential values for the timing parameter of the first timing parameter table are based on the first tone spacing, and the potential values for the timing parameter of the second timing parameter table are based on the second tone spacing.

Some examples of the method, apparatuses, and non-transitory computer-readable medium described herein may include operations, features, means, or instructions for adjusting a minimum value of the timing parameter, based on switching communications from the first BWP to the second BWP.

In some examples of the method, apparatuses, and non-transitory computer-readable medium described herein, identifying the set of timing parameter tables may include operations, features, means, or instructions for receiving at least one of the set of timing parameter tables from the base station via RRC signaling.

In some examples of the method, apparatuses, and non-transitory computer-readable medium described herein, communicating with the base station in accordance with the value for the timing parameter may include operations, features, means, or instructions for receiving a PDSCH transmission.

In some examples of the method, apparatuses, and non-transitory computer-readable medium described herein, communicating with the base station in accordance with the value for the timing parameter may include operations, features, means, or instructions for transmitting a PUSCH transmission.

Some examples of the method, apparatuses, and non-transitory computer-readable medium described herein may further include operations, features, means, or instructions for identifying a format for the DCI transmission and selecting the second timing parameter table from the set of timing parameter tables based on the format of the DCI transmission.

In some examples of the method, apparatuses, and non-transitory computer-readable medium described herein, the DCI transmission includes a BWP identification field that activates the second BWP.

In some examples of the method, apparatuses, and non-transitory computer-readable medium described herein, the first BWP may be associated with a lower transmission power than the second BWP.

A method of wireless communication is described. The method may include identifying a set of timing parameter tables that each define one or more potential values for a timing parameter associated with a timing between transmission, to a UE, of DCI and a subsequent communication with the UE according to the DCI, the set of timing parameter tables including at least a first timing parameter table associated with a first BWP and a second timing parameter table associated with a second BWP, selecting a value for the timing parameter based on the second timing parameter table, transmitting, over the first BWP, a DCI transmission that activates the second BWP, the DCI transmission including a resource allocation bit field indicating the value for the timing parameter, where a size of the resource allocation bit field is based on a configuration of the first BWP, and communicating with the UE over the second BWP in accordance with the value for the timing parameter.

An apparatus for wireless communication is described. The apparatus may include a processor, memory coupled with the processor, and instructions stored in the memory. The instructions may be executable by the processor to cause the apparatus to identifying a set of timing parameter tables that each define one or more potential values for a timing parameter associated with a timing between transmission, to a UE, of DCI and a subsequent communication with the UE according to the DCI, the set of timing parameter tables including at least a first timing parameter table associated with a first BWP and a second timing parameter table associated with a second BWP, selecting a value for the timing parameter based on the second timing parameter table, transmitting, over the first BWP, a DCI transmission that activates the second BWP, the DCI transmission including a resource allocation bit field indicating the value for the timing parameter, where a size of the resource allocation bit field is based on a configuration of the first BWP, and communicating with the UE over the second BWP in accordance with the value for the timing parameter.

Another apparatus for wireless communication is described. The apparatus may include identifying a set of timing parameter tables that each define one or more potential values for a timing parameter associated with a timing between transmission, to a UE, of DCI and a subsequent communication with the UE according to the DCI, the set of timing parameter tables including at least a first timing parameter table associated with a first BWP and a second timing parameter table associated with a second BWP, selecting a value for the timing parameter based on the second timing parameter table, transmitting, over the first BWP, a DCI transmission that activates the second BWP, the DCI transmission including a resource allocation bit field indicating the value for the timing parameter, where a size of the resource allocation bit field is based on a configuration of the first BWP, and communicating with the UE over the second BWP in accordance with the value for the timing parameter.

A non-transitory computer-readable medium storing code for wireless communication is described. The code may include instructions executable by a processor to identifying a set of timing parameter tables that each define one or more potential values for a timing parameter associated with a timing between transmission, to a UE, of DCI and a subsequent communication with the UE according to the DCI, the set of timing parameter tables including at least a first timing parameter table associated with a first BWP and a second timing parameter table associated with a second BWP, selecting a value for the timing parameter based on the second timing parameter table, transmitting, over the first BWP, a DCI transmission that activates the second BWP, the DCI transmission including a resource allocation bit field indicating the value for the timing parameter, where a size of the resource allocation bit field is based on a configuration of the first BWP, and communicating with the UE over the second BWP in accordance with the value for the timing parameter.

In some examples of the method, apparatuses, and non-transitory computer-readable medium described herein, the first timing parameter table includes a first set of rows and the second timing parameter table includes a second set of rows, each row of the first set of rows and the second set of rows indicating a potential value for the timing parameter, and where the size of the resource allocation bit field may be based on a number of rows in the first set of rows.

In some examples of the method, apparatuses, and non-transitory computer-readable medium described herein, the first set of rows may include operations, features, means, or instructions for zero-padding the resource allocation bit field.

In some examples of the method, apparatuses, and non-transitory computer-readable medium described herein, the first set of rows may include operations, features, means, or instructions for identifying a subset of the second set of rows that may be addressable by the resource allocation bit field and selecting the value for the timing parameter based on the subset of the second set of rows.

In some examples of the method, apparatuses, and non-transitory computer-readable medium described herein, the subset of the second set of rows includes a lowest-indexed row of the second set of rows, the lowest-indexed row corresponding to a preferred value of the timing parameter for switching to the second BWP.

In some examples of the method, apparatuses, and non-transitory computer-readable medium described herein, the subset of the second set of rows includes a set of lowest-indexed rows of the second plurality of rows, the set of lowest-indexed rows corresponding to a set of values of the timing parameter, where the values of the timing parameter are ordered from the largest value of the timing parameter to the smallest value of the timing parameter, for switching to the second BWP.

In some examples of the method, apparatuses, and non-transitory computer-readable medium described herein, the subset of the second set of rows includes at least one row corresponding to a preferred value of the timing parameter for communicating in the second BWP.

In some examples of the method, apparatuses, and non-transitory computer-readable medium described herein, the preferred value of the timing parameter includes a first value for wakeup communications, a second value for data communications, or a third value for micro-sleep communications.

In some examples of the method, apparatuses, and non-transitory computer-readable medium described herein, the first timing parameter table may be associated with uplink transmissions over the first BWP, the set of timing parameter tables further including a third timing parameter table associated with downlink transmissions over the first BWP.

In some examples of the method, apparatuses, and non-transitory computer-readable medium described herein, the first BWP may have a first tone spacing and the second BWP may have a second tone spacing, the potential values for the timing parameter of the first timing parameter table based on the first tone spacing and the potential values for the timing parameter of the second timing parameter table based on the second tone spacing.

In some examples of the method, apparatuses, and non-transitory computer-readable medium described herein may include operations, features, means, or instructions for adjusting a minimum value of the timing parameter, based on switching communications from the first BWP to the second BWP.

Some examples of the method, apparatuses, and non-transitory computer-readable medium described herein may further include operations, features, means, or instructions for transmitting at least one of the set of timing parameter tables to the UE via RRC signaling.

In some examples of the method, apparatuses, and non-transitory computer-readable medium described herein, communicating with the UE in accordance with the value for the timing parameter may include operations, features, means, or instructions for transmitting a PDSCH transmission.

In some examples of the method, apparatuses, and non-transitory computer-readable medium described herein, communicating with the UE in accordance with the value for the timing parameter may include operations, features, means, or instructions for receiving a PUSCH transmission.

Some examples of the method, apparatuses, and non-transitory computer-readable medium described herein may further include operations, features, means, or instructions for identifying a trigger for switching communications with the UE from the first BWP to the second BWP, and identifying a format for the DCI transmission based on the trigger.

In some examples of the method, apparatuses, and non-transitory computer-readable medium described herein, the DCI transmission includes a BWP identification field that activates the second BWP.

In some examples of the method, apparatuses, and non-transitory computer-readable medium described herein, the first BWP may be associated with a lower transmission power than the second BWP.

DETAILED DESCRIPTION

In some wireless communication systems, the size (e.g., bit length) of one or more downlink control information (DCI) bit fields may be based on the size (e.g., bandwidth) of an associated bandwidth part (BWP). DCI signaling may be used to control and facilitate switching between a current BWP of a first size and a target BWP of a second size during a BWP switching event. Switching between respective BWPs may be controlled through downlink signaling, such as DCI, which may enable various schemes for resource assignments and for triggering of BWP switching.

In some cases, cross-slot scheduling, as well as cross-BWP scheduling, may help to accommodate latency in switching between the narrow and wide BWPs. For example, DCI signaling may be used to control a switch from a narrow BWP format in a first slot to a wide BWP format in a second slot, or vice versa, where the different BWP formats have different DCI field sizes. In some cases, a base station may signal to a user equipment (UE) a transmission delay associated with downlink and uplink transmissions (e.g., a timing parameter). Examples of such timing parameters include k0 values and k2 values. A k0 value may, for example, correspond to a delay between a downlink grant (e.g., a first slot containing DCI) and a downlink data assignment (e.g., a second slot containing a physical downlink shared channel (PDSCH) transmission). Similarly, a k2 value may correspond to a delay between a downlink grant and an uplink data assignment (e.g., a second slot containing a physical uplink shared channel (PUSCH) transmission). In some examples, k0 and k2 may represent a number of slots (e.g., or some other suitable time interval). In some cases, the timing parameter(s) may be signaled via a DCI bit field. For example, the DCI bit field may contain an index to a table configured (e.g., via radio resource control (RRC) signaling) for the current BWP.

The size of one or more, or all, DCI bit fields may be determined according to the current BWP. For example, a size of the bit field indexing the configured table may be based on a number of rows in the table. However, during a BWP switch (e.g., from a first BWP having a table with four rows to a second BWP having a table with eight rows), the DCI bit field (e.g., which is based on a configuration of the first BWP) may only be large enough to index four rows of the second BWP table. Considerations for timing parameter management for BWP switching are discussed herein.

Aspects of the disclosure are initially described in the context of a wireless communications systems. Aspects of the disclosure are then described in the context of communication diagrams, process flows, and transmission scheme. Aspects of the disclosure are further illustrated by and described with reference to apparatus diagrams, system diagrams, and flowcharts that relate to timing parameter management for bandwidth part switching.

Figure 1:
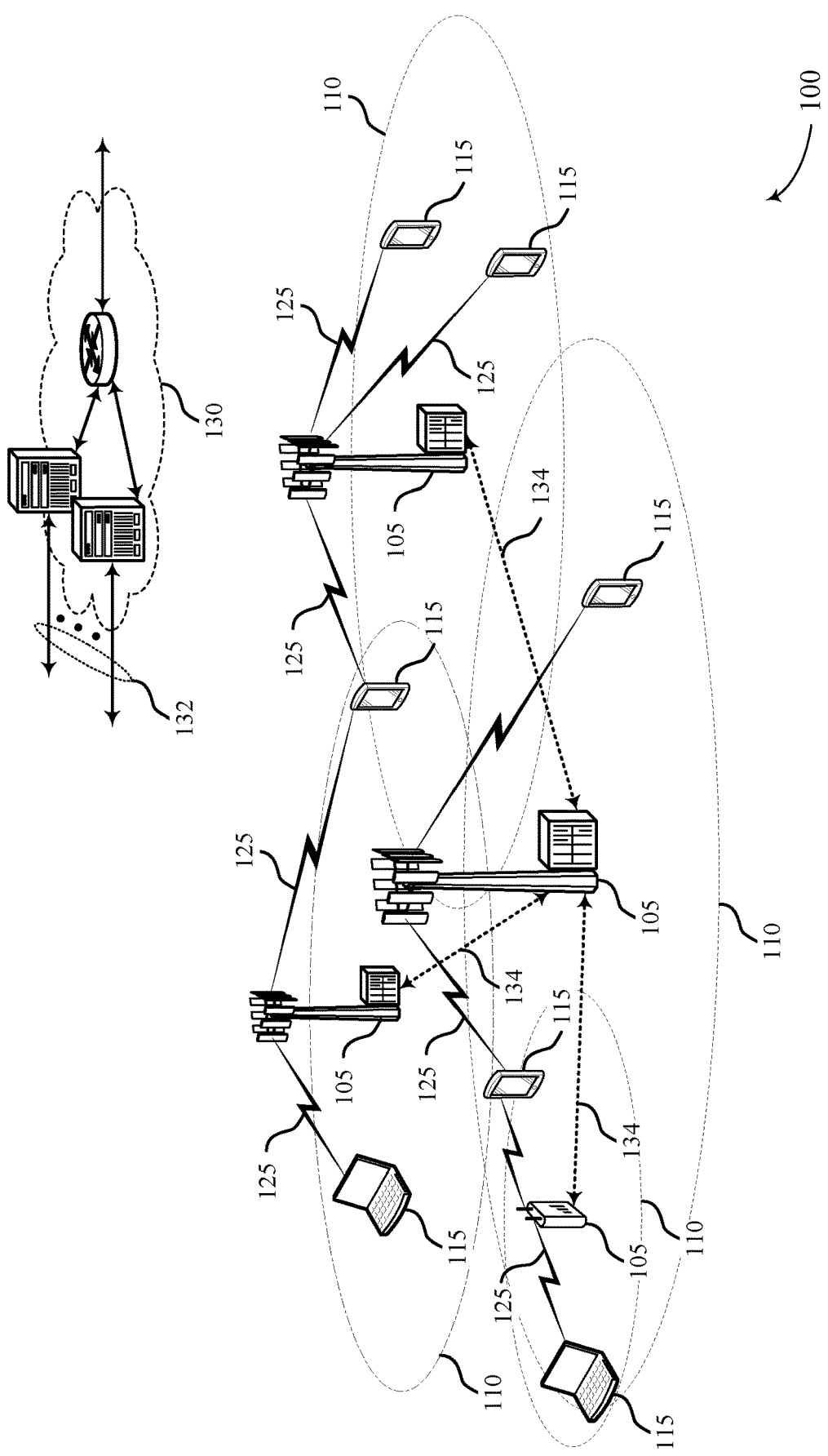
FIG. 1 illustrates an example of a wireless communications system that supports timing parameter management for bandwidth part switching in accordance with aspects of the present disclosure.

FIG. 1 illustrates an example of a wireless communications system 100 that supports timing parameter management for bandwidth part switching in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may in some cases support BWPs, which may allow a UE 115 to operate within a smaller frequency range than a CC bandwidth. A UE 115 may in some cases be configured with multiple BWPs (e.g., each with different frequency locations, bandwidths, timing parameters, numerologies, etc.). Control information (e.g., DCI) may be used to trigger BWP switching for a given UE 115. For example, each UE 115 may support at most one active BWP for each serving cell (e.g., although the UE 115 may be configured with multiple BWPs per serving cell). DCI may contain a BWP identification (ID) field indicating the BWP that should be activated for a scheduled time slot (e.g., k0 slots or k2 slots after the DCI is received). Once a BWP is activated, it may remain active until another BWP is activated (e.g., or until a timer expires). If the BWP ID field in the DCI is different from the currently active BWP, a BWP switch may be triggered (e.g., such that cross-BWP scheduling triggers a BWP switch).

The size (e.g., bit-length) of one or more (or all) fields in the DCI may be based on the currently active BWP. For example, the size of a time domain resource allocation field may be based on the number of timing parameter (e.g., k0, k2) values supported by the currently activated BWP. If the BWP ID field indicates another BWP (e.g., a BWP different from the currently active BWP) that supports a different number of potential timing parameter values, the time domain resource allocation field based on the currently active BWP may not be large enough (e.g., or may be too large) for the newly indicated BWP. In some cases, a base station may zero-pad bit fields that are too small and truncate bit fields that are too large for the newly indicated BWP.

That is, for cross-BWP scheduling, one or more bit fields in a DCI transmission (e.g., a time-domain resource allocation field) may be sized based on the current BWP but may index the new BWP table (e.g., a PDSCH-symbol allocation table, a PUSCH symbol allocation table, etc.). When the number of bits in the time-domain resource allocation field is not sufficient to address all rows in the new BWP table, a UE 115 may interpret the field to reference only the lower indexed rows of the table (e.g., starting from a first row and proceeding to a last addressable row). It is to be understood that in some cases, the UE 115 may interpret the field to reference only the higher indexed rows of the table (e.g., starting from a last row and proceeding upwards to a last addressable row), some internal subset of rows in the table, etc.

When the number of bits in the time-domain resource allocation field is too large for the new BWP table, a UE 115 may expect only the lower bits (e.g., least significant bits) of the bit field to be used to address the rows of the new BWP table (e.g., such that truncation may start from the most significant bit). It is to be understood that truncation may alternatively start from the least significant bit without deviating from the scope of the present disclosure. For cross BWP-scheduling in which the BWPs have different numerologies (e.g., a first BWP uses longer symbol periods than a second BWP), the numerology of the new BWP may be used for interpretation of timing parameters (e.g., k0 and k2 as for DCI format 1-1 or 0-1, respectively). For example, using the numerology of the new BWP may provide consistency with cross-carrier scheduling (e.g., for carrier aggregation) with different numerologies for the timing parameters.

Figure 2:
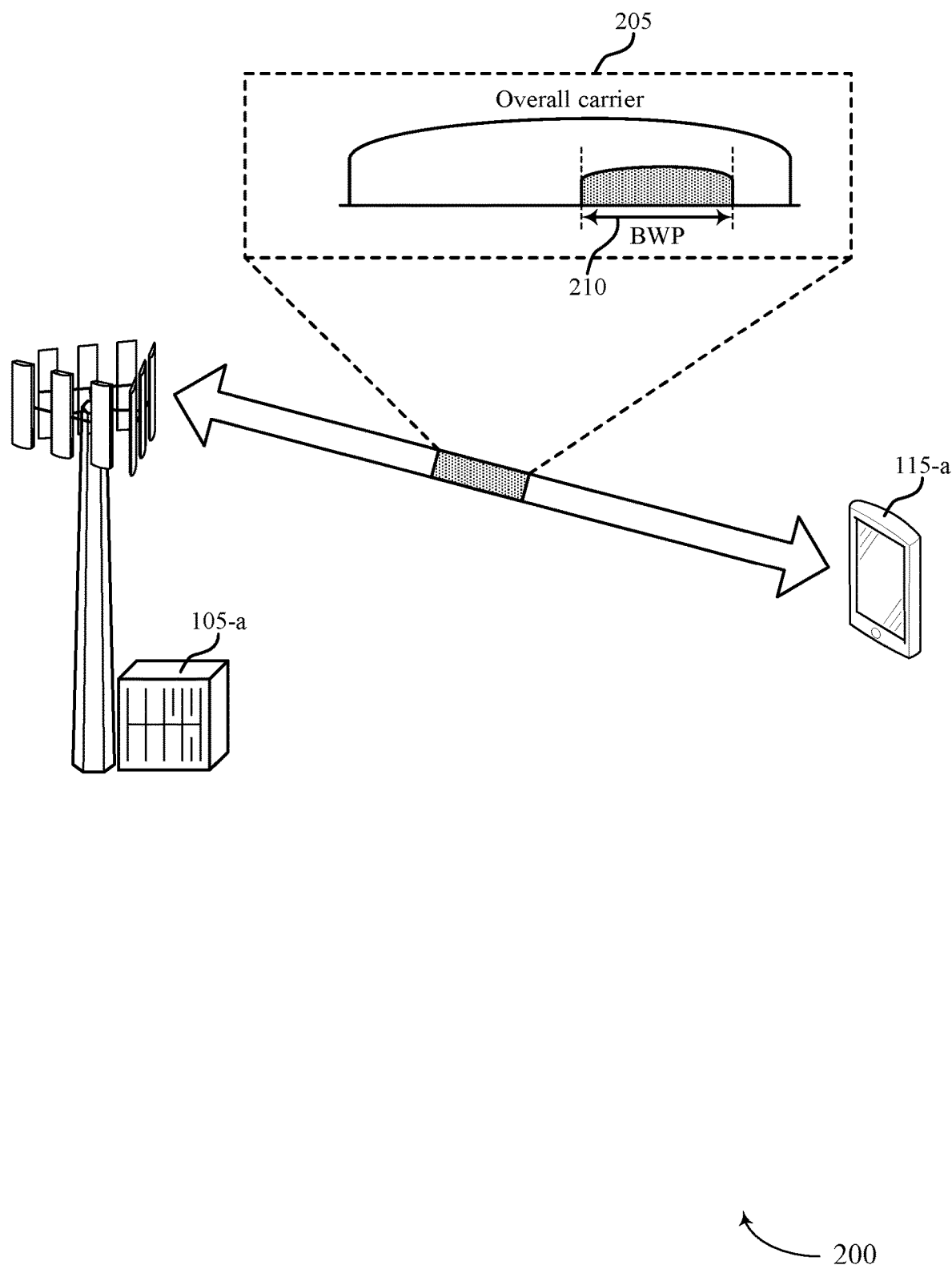
FIG. 2 illustrates an example of a wireless communications system that supports timing parameter management for bandwidth part switching in accordance with aspects of the present disclosure.

FIG. 2 illustrates an example of a wireless communications system 200 that supports timing parameter management for bandwidth part switching in accordance with aspects of the present disclosure. In some examples, wireless communications system 200 may implement aspects of wireless communications system 100. Wireless communications system 200 may include a base station 105-a and a UE 15-a that may communicate information using a carrier 205. The wireless communications system 200 may be configured to use one or more BWPs 210 to communicate information in the overall carrier 205.

A BWP 210 may be a group of contiguous physical resource blocks (PRBs). The bandwidth of the BWP 210 may be equal to or smaller than a maximum bandwidth capability supported by a UE 115-a or the bandwidth of the overall carrier 205. In some cases, the bandwidth of the BWP 210 may be at least as large as a bandwidth of a synchronization signal (SS) block.

In some cases, the BWP 210 may be a dynamically-configured (or semi-statically configured) portion of the overall carrier 205. The BWP 210 may include a number of dynamically (or semi-statically) configurable parameters. Examples of such parameters may include frequency location (e.g., center frequency), bandwidth (e.g., number of PRBs), numerology (e.g., sub-carrier spacing and/or cyclic prefix type), or a combination thereof. The parameters of the BWP 210 may be communicated using DCI, a medium access control (MAC) control element (CE), RRC signaling, and/or a time pattern (e.g., in a discontinuous reception situation). The granularity of certain parameters may be the size of one PRB (e.g., a bandwidth granularity may be 1 PRB and frequency location granularity may be 1 PRB).

A BWP 210 may be configured for downlink and for uplink. BWPs 210 may be configured independently for each cell (e.g., primary cells (PCells) and/or secondary cells (SCells)). In such cases, if an SCell is deactivated, the BWPs of that cell may also be deactivated. In some cases, the UE 115-a may be configured to communicate using one or more downlink BWPs and/or one or more uplink BWPs at the same time. In some cases, there may be at most one active downlink BWP and at most one active uplink BWP at a given time for a serving cell. A PCell may be the cell that handles the RRC connection between the UE 115-a and the base station 105-a and an SCell may be any other serving cell established between the UE 115-a and the base station 105-a.

BWPs 210 may be used in both paired spectrum and unpaired spectrum. In paired spectrum, a first frequency spectrum band may be allocated (e.g., dedicated) to downlink communications and a second frequency spectrum band may be allocated (e.g., dedicated) to uplink communications. Paired spectrum may use FDD systems to establish two-way communications between nodes. In unpaired spectrum, the same frequency spectrum band may be used for both uplink and downlink communications. Unpaired spectrum may use TDD systems to establish two-way communications between nodes. In some cases, for paired spectrum, a maximum number of BWP configurations may be four downlink BWPs and four uplink BWPs. In some cases, for unpaired spectrum, a maximum number of BWP configurations may be four downlink/uplink BWP pairs. In some cases, for FDD, the BWPs for downlink and the BWPs for uplink may be configured independently on a per-component carrier (CC) basis. In some cases, for TDD, a joint set of downlink BWPs and uplink BWPs may be configured on a per-CC basis.

In some cases, an active BWP 210 of the UE 115-a may not span a frequency spectrum band larger than a bandwidth of a CC of the UE 115-a. The configuration for a downlink BWP may include at least one control resource set (coreset). In some cases, at least one configured downlink BWP may include a coreset with a control search space (CSS) in a primary component carrier (PCC). In some cases, in a PCell for the UE 115-a, a CSS may be configured in each BWP 210. In some cases, each configured downlink BWP may include at least one coreset with a UE-specific search space (UE-SS) for the case of single active BWP at a given time. In some cases, if the active downlink BWP does not include a CSS, then UE 115-a may not monitor the CSS. The CSS may include communication resources where the UE is configured to look for physical downlink control channel (PDCCH) which carries downlink control information (DCI) as its payload.

Upon establishing an RRC connection, the UE 115-a or the base station 105-a may activate a default configuration of one or more BWPs 210 (e.g., a downlink BWP and an uplink BWP). The UE 115-a and the base station 105-a may use those default BWPs 210 until the BWPs 210 are explicitly configured or reconfigured.

The wireless communications system 200 may also support a BWP switching event. In some cases, the UE 115-a (or the base station 105-a) be configured to use one BWP 210 of a carrier 205 at a time. In such cases, if the UE 115-a (or the base station 105-a) is to use a different BWP for the carrier 205, the UE 115-a (or the base station 105-a) may reconfigure its BWP 210. As part of a BWP switching event, the UE 115-a (or the base station 105-a) may switch the active BWP to a target BWP within a given serving cell. A BWP switching event may be signaled using DCI. In some cases, a downlink BWP 210 may be switched using a downlink scheduling DCI and an uplink BWP 210 may be switched using an uplink scheduling DCI. In some cases, either downlink BWPs or uplink BWPs may be switched using either downlink DCI or uplink DCI. In some cases, the wireless communications system 200 may support a timer for timer-based active BWP switching. In such a time-based configuration, the BWP 210 may switch from an active BWP 210 to a default BWP 210 based on the timer expiring.

As described herein, various techniques may be used for efficient BWP switching in wireless communications system 200. For example, BWP switching may include time-domain resource allocation (e.g., to allow for transition between BWPs 210). Aspects of the present disclosure relate to support for such time domain resource allocation including considerations for timing parameter tables, timing parameter interpretations, BWP signaling, etc.

Figure 3:
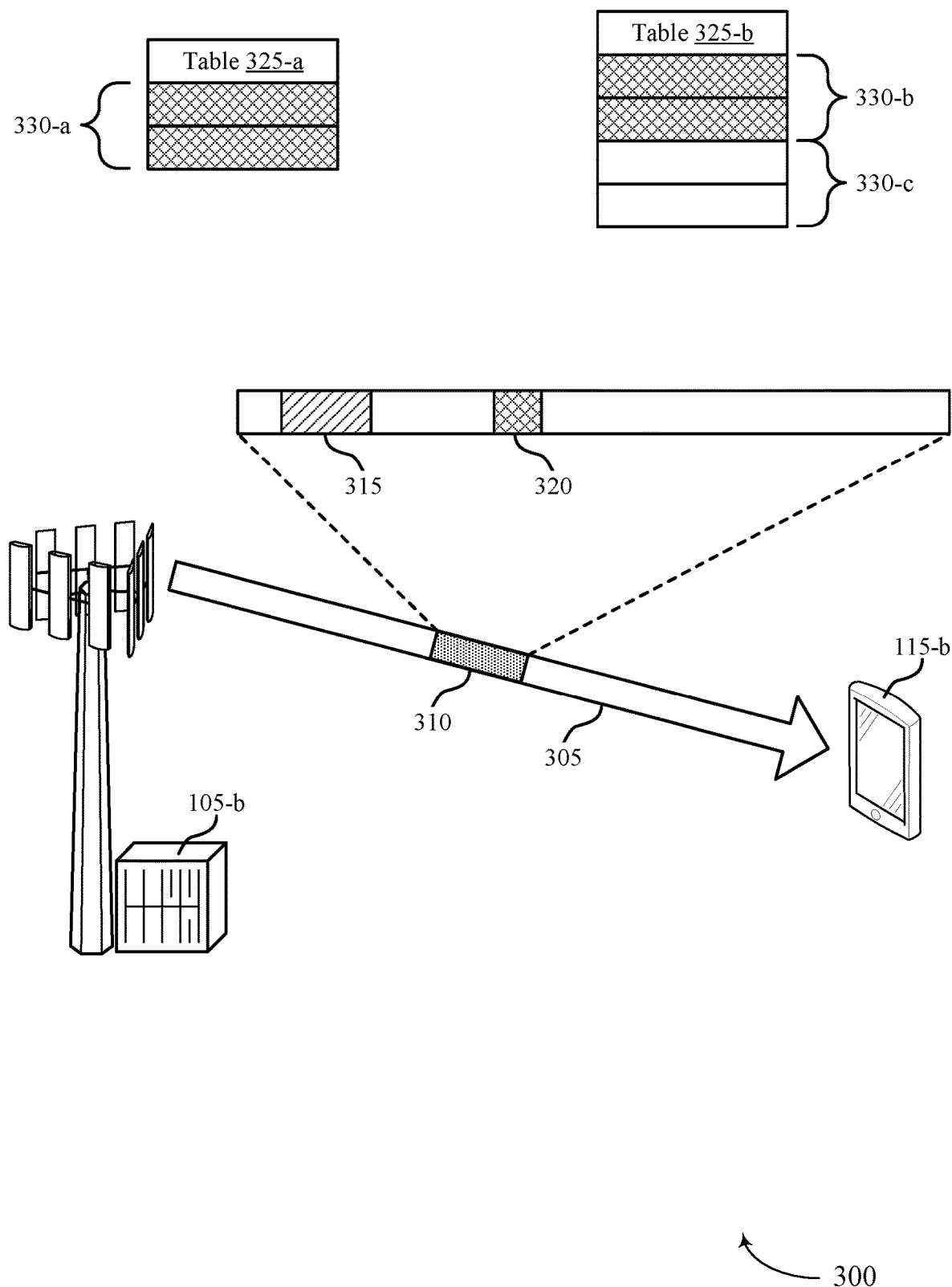
FIG. 3 illustrates an example of a communications diagram that supports timing parameter management for bandwidth part switching in accordance with aspects of the present disclosure.

FIG. 3 illustrates an example of a communications diagram 300 that supports timing parameter management for bandwidth part switching in accordance with aspects of the present disclosure. In some examples, communications diagram 300 may implement aspects of wireless communication system 100. Communications diagram includes base station 105-b and UE 115-b, each of which may be an example of the corresponding device described with reference to FIG. 1.

Base station 105-b and UE 115-b may establish communication over a PCC as described with reference to FIG. 2. For example, base station 105-b may configure UE 115-b with one or more BWPs (including BWP 305) via RRC signaling, where each BWP may be associated with one or more timing parameter tables 325 (e.g., one table for uplink per BWP and one table for downlink per BWP). Each timing parameter table 325 may, for instance, contain up to sixteen rows, where each row may be configured with k0 (for a downlink timing parameter table 325) or k2 (for an uplink timing parameter table 325), an index into a table or equation capturing valid combinations of starting symbols and symbol lengths (e.g., which may be jointly encoded), and a mapping type (e.g., a PDSCH mapping type for a downlink timing parameter table 325 or a PUSCH mapping type for an uplink timing parameter table 325). In the present example, base station 105-b may configure UE 115-b with timing parameter table 325-a for downlink communications in BWP 305 and timing parameter table 325-b for downlink communications in another BWP (e.g., another BWP for which k0 and a PDSCH mapping type are configured along with the PDSCH starting symbols and symbol lengths). Though described in the context of downlink communications, analogous techniques may be employed for uplink communications (e.g., using BWPs for which k2 and a PUSCH mapping type are configured along with the PUSCH starting symbols and symbol lengths).

In some cases, the devices may subsequently communicate via BWP 305 (e.g., which may be an example of BWP 210). Communications over BWP 305 may in some cases be supported by DCI 310. For example, DCI 310 may be used for downlink resource allocation (e.g., DCI format 1_1), uplink resource allocation (e.g., DCI format 0_1), etc. DCI 310 may include a plurality of bit-fields including an BWP ID field 315 and a resource allocation field 320 (e.g., which may alternatively be referred to as a time-domain resource allocation field 320). As described above, one or more bit-fields of DCI 310 may be sized based at least in part on BWP 305.

For example, resource allocation field 320 may have a single bit to distinguish between rows 330-a of timing parameter table 325-a. However, in cases in which BWP ID field 315 indicates another BWP (e.g., the BWP for which timing parameter table 325-b was configured), timing parameter management may support the BWP switching. Because resource allocation field 320 contains a single bit, only rows 330-b of timing parameter table 325-b may be addressable by DCI 310 (e.g., such that rows 330-c may be unavailable for the BWP switch). Aspects of the present disclosure relate to considerations for a format of timing parameter table 325-b to support BWP switching (e.g., such that rows 330-b may contain timing parameters that support efficient BWP switching).

Though described in the context of two timing parameter tables 325, in some cases BWP switching may be supported by a single timing parameter table 325 (e.g., a table configured via RRC signaling for BWP switching events). Such a table may, for example, be supported by DCI 310 that indicates a BWP switch having a set (e.g., pre-configured, negotiated, etc.) length for resource allocation field 320.

Figure 4:
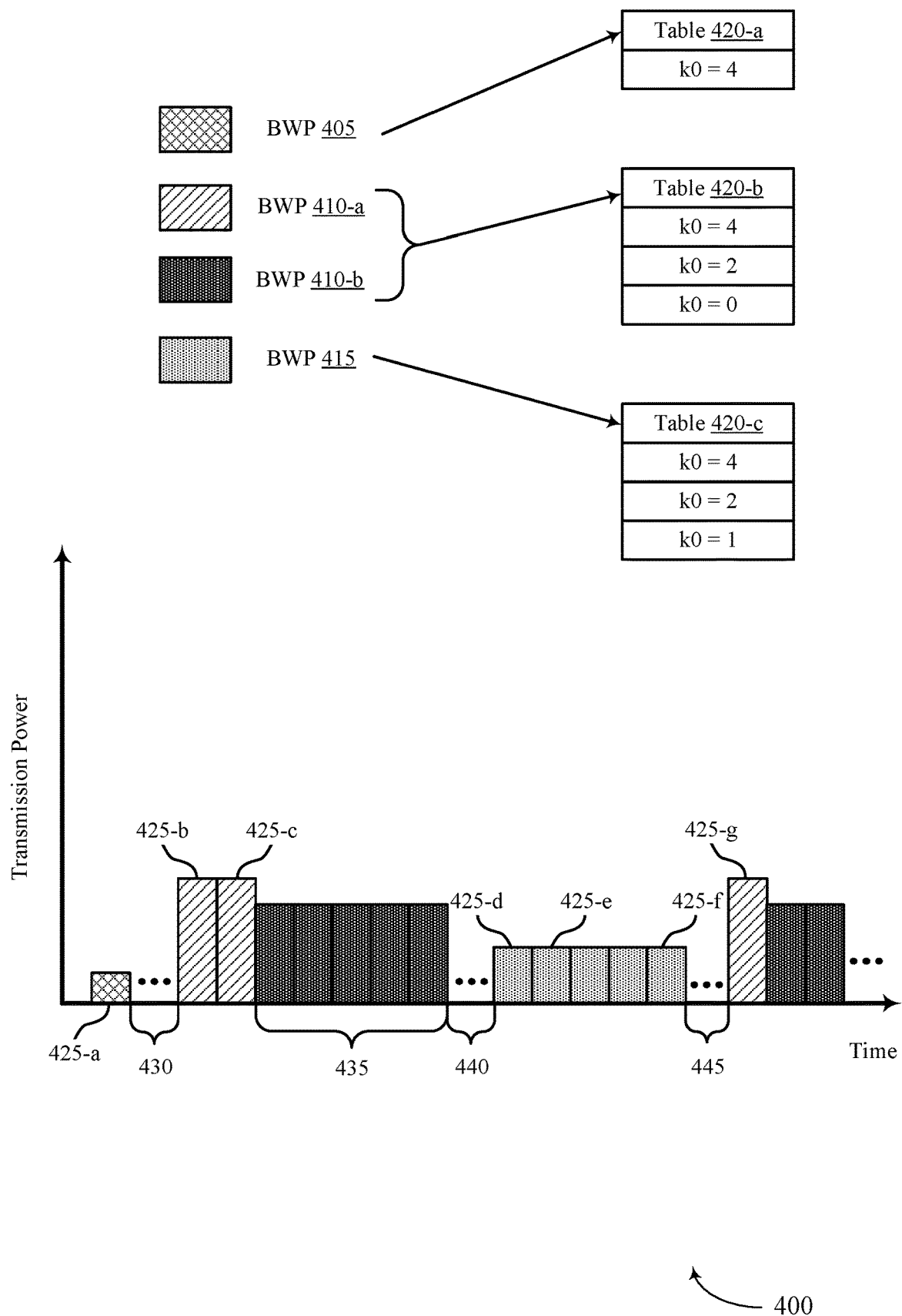
FIGS. 4 through 6 illustrate example transmission schemes that support timing parameter management for bandwidth part switching in accordance with aspects of the present disclosure.

FIG. 4 illustrates an example of a transmission scheme 400 that supports timing parameter management for bandwidth part switching in accordance with aspects of the present disclosure. In some examples, transmission scheme 400 may implement aspects of wireless communications system 100. For example, transmission scheme 400 may illustrate aspects of communications between a base station 105 and a UE 115 over multiple (e.g., three) BWPs. For example, the base station 105 may configure the UE 115 with timing parameter table 420-*a* for BWP 405 (e.g., a starting BWP), timing parameter table 420-*b* for BWP 410 (e.g. which may support data communications), and timing parameter table 420-*c* for BWP 415 (e.g., a default BWP).

Though described in the context of three BWPs, it is to be understood that any suitable number of BWPs may be supported using techniques described with reference to transmission scheme 400. Similarly, the sizes and contents of timing parameter tables 420 are included for the sake of explanation and are not limiting of scope. For example, though described in the context of k0 timing parameters, it is to be understood that analogous techniques may be used for k2 timing parameter management. Additionally, in some cases timing parameter tables 420 may contain up to sixteen (e.g., or more) rows. At least some of the rows of a given timing parameter table may share a common k0 or k2 value (e.g., but may be distinguished by a mapping type and/or a symbol length indicator value (SLIV)). For the sake of explanation, the rows of timing parameter tables 420 are considered to be distinguished based on k0 values.

In the present example, the base station 105 may transmit DCI during slot 425-*a* over BWP 405. For example, the DCI in slot 425-*a* may be an example of DCI 310 described with reference to FIG. 3. Because the DCI in slot 425-*a* is transmitted over BWP 405, it may have a resource allocation field with a bit length of zero bits (e.g., because timing parameter table 420-*a* contains a single row). However, the DCI in slot 425-*a* may contain a BWP ID field indicating a BWP switch (e.g., a field indicating BWP 410). That is, the DCI in slot 425-*a* may schedule a PDSCH transmission over BWP 410. As such, the resource allocation field of the DCI in slot 425-*a* may be understood by a UE 115 receiving the DCI to index timing parameter table 420-*b* (e.g., the timing parameter table 420 corresponding to the BWP indicated in the BWP ID field). Because the resource allocation field of the DCI in slot 425-*a* may not be able to address the second or third rows of timing parameter table 420-*b*, the UE 115 may identify a value of k0=4 for the BWP switch. For example, k0=4 may mean that a duration 430 of four slots (e.g., or some other suitable time interval) may elapse between slot 425-*a* and the scheduled PDSCH transmission in slot 425-*b*.

The UE 115-*b* may receive the scheduled PDSCH transmission in slot 425-*b* over BWP 410. In some cases, the UE 115-*b* may receive DCI in slot 425-*c* scheduling a PDSCH transmission in slot 425-*c* over BWP 410. That is, because a resource allocation field of the DCI in slot 425-*c* may be sized based on timing parameter table 420-*b* (e.g., may have a length of two bits), all rows in timing parameter table 420-*b* may be addressable by the DCI in slot 425-*b*. Accordingly, the DCI in slot 425-*c* may indicate a value of k0=0 (e.g., a delay of zero slots between the DCI scheduling the PDSCH transmission and the PDSCH transmission itself). Accordingly, the UE 115-*b* may receive the PDSCH transmission in slot 425-*c*.

After slot 425-*c*, a BWP timer 435 may run (e.g., for a configured, negotiated, etc. number of slots 425). Though illustrated as containing five slots 425, it is to be understood that BWP timer 435 may in some cases contain more or fewer than five slots 425. BWP timer 435 may run as long as no data is received by the UE 115. Thus, the device may still monitor BWP 410 (e.g., as illustrated by BWP 410-*b*) without receiving data (e.g., which may reduce a power consumption of the device compared to slots 425-*b* and 425-*c*, which are illustrated by BWP 410-*a*). Thus, it is to be understood that BWP 410-*a* and BWP 410-*b* may refer to a same BWP (e.g., a same set of PRBs) but may represent different power consumption over that BWP based on whether data is being transferred.

At the expiration of BWP timer 435, the UE 115 may transition to BWP 415 (e.g., which may be an example of a default BWP). The transition to BWP 415 may alternatively (e.g., rather than being based on the expiration of BWP timer 435) be based on explicit DCI signaling (e.g., in a slot contained within BWP timer 435). In some cases, the transition to BWP 415 may occupy a duration 440 based on an indicated (e.g., in the case of the explicit DCI signaling) or understood (e.g., in the case of the expiration of the timer) k0 value. By way of example, if explicit DCI signaling indicates k0=2 (e.g., because all rows of timing parameter table 420-*b* are addressable by DCI sent over BWP 410), duration 440 may last two slots (e.g., during which time the UE 115 does not expect to receive downlink signals from the base station 105).

In some cases, the UE 115 may receive DCI in slot 425-*d* indicating k0=1 (e.g., indexing the third row of timing parameter table 420-*c*). For example, such a k0 configuration (e.g., a small non-zero k0 value) may support microsleep operations for the UE 115. Accordingly, the UE 115 may receive a PDSCH transmission in slot 425-*e* based on scheduling received via DCI in slot 425-*d*. In slot 425-*f*, the UE may receive DCI indicating k0=2 (e.g., indexing the second row of timing parameter table 420-*b*) and indicating a BWP switch (e.g., to BWP 410). Because timing parameter table 420-*b* and timing parameter table 420-*c* are of a same size, no transformation (e.g., truncation or zero-padding) may be needed for the DCI. Based on the DCI in slot 425-*f*, the UE may receive PDSCH in slot 425-*g* (e.g., following the two slots indicated by the DCI and represented by duration 445).

In some cases, consideration may be given for support of minimum k0 (e.g., or k2) values in a layout of timing parameter tables 420. For example, a wireless communications system may benefit from a timing parameter table 420 associated with a wakeup BWP (e.g., BWP 405) having a large k0 (e.g., k0=4) for PDCCH to PDSCH modem wakeup. Similarly, the wireless communications system may benefit from a timing parameter table 420 having a small k0 (e.g., k0=0) for low latency access during data scheduling. Lastly, the wireless communications system may benefit from a timing parameter table having a small, non-zero k0 (e.g., k0=1) for microsleep operations, as described above. Thus, the minimum k0 value may be important for power saving at a UE 115 (e.g., by providing flexibility in PDSCH modem activation and maintenance). In accordance with aspects of the present disclosure, one or more timing parameter tables 420 may be configured such that the lowest-indexed rows (e.g., the rows which are addressable by shorter resource allocation fields) may contain important k0 values for one or more of the operations described above. In some examples, the lowest-indexed rows (e.g., the rows which are addressable by shorter resource allocation fields) may include the k0 values which may be ordered from the larger k0 values being in the accessible portion of the timing parameter table, to the lower k0 values being further down in the timing parameter table. In some examples, the minimum k0 (e.g., or k2) value may be adjusted when switching communications from the first BWP to the second BWP.

Figure 5:
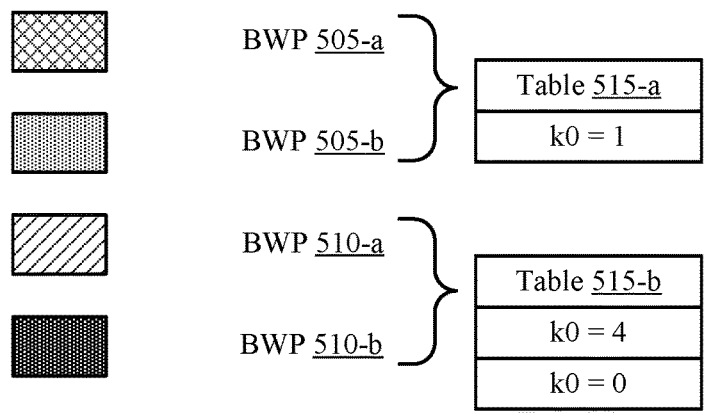
Figure 5:
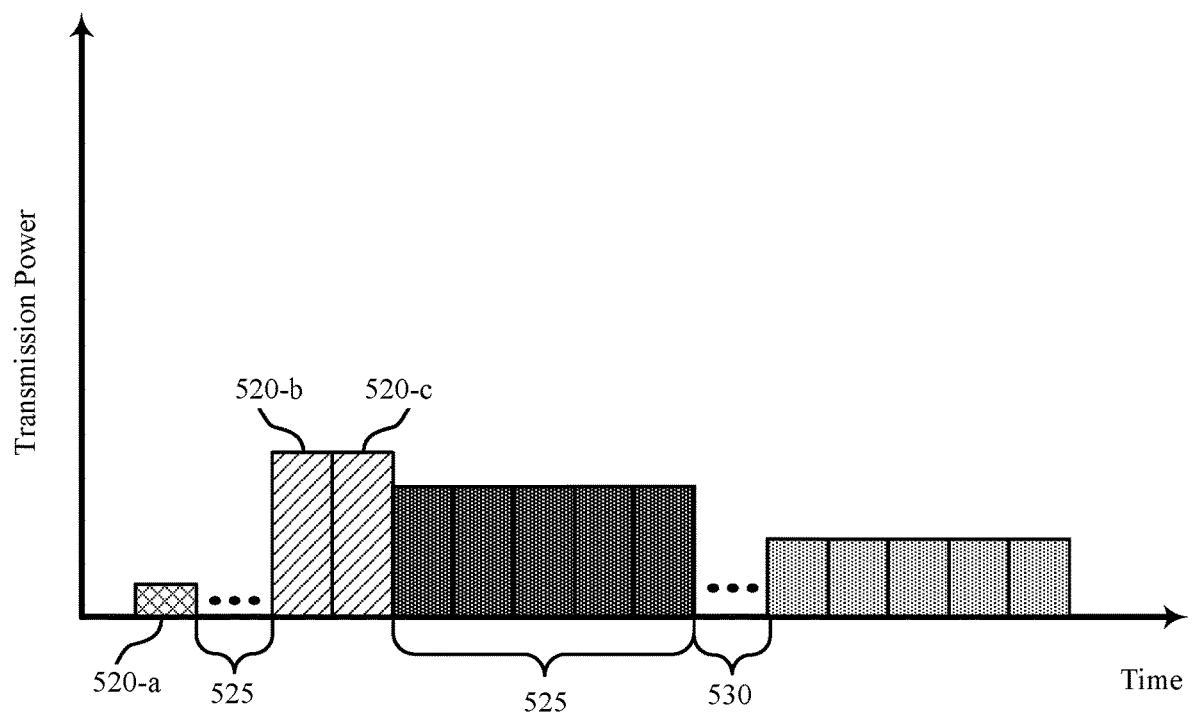

FIG. 5 illustrates an example of a transmission scheme 500 that supports timing parameter management for bandwidth part switching in accordance with aspects of the present disclosure. In some examples, transmission scheme 500 may implement aspects of wireless communications system 100. For example, transmission scheme 400 may illustrate aspects of communications between a base station 105 and a UE 115 over multiple (e.g., two) BWPs. For example, the base station 105 may configure the UE 115 with timing parameter table 515-a for BWP 505 (e.g., a low power BWP) and timing parameter table 515-b for BWP 510 (e.g. a high power BWP). For example, BWP 510 may be associated with a wider bandwidth than BWP 505. Alternatively, BWP 510 and BWP 505 may have the same bandwidth, and the power saving for BWP 505 may be based on k0 (e.g., or k2) adaptation.

Aspects of the present example may relate to support for a two stage wakeup and efficient microsleep operations. Additionally or alternatively, aspects of the present example may relate to support for three minimum k0 values over two BWPs (e.g., compared to the support of three minimum k0 values over three BWPs described with reference to FIG. 4). As with FIG. 4, aspects of the following are included for the sake of explanation and are not limiting of scope.

A UE 115 may wakeup during slot 520-a (e.g., based on a discontinuous reception cycle, a wakeup signal, or the like) and receive DCI on BWP 505. The DCI may include a BWP ID of BWP 510 (e.g., cross-BWP scheduling) and a resource allocation field sized according to timing parameter table 515-a (e.g., a zero bit resource allocation field). Because of the cross-BWP scheduling, the resource allocation field may index into timing parameter table 515-b. Accordingly, the UE 115 may determine k0=4 such that duration 425 between receiving the DCI in slot 520-a and receiving the PDSCH in slot 520-b may last for four slots. For example, such a relatively large k0 may allow sufficient time for PDCCH to PDSCH modem wakeup (e.g., thereby supporting power conservation for the UE 115).

Once BWP 510 becomes the active BWP, the resource allocation field of the DCI may be sized according to timing parameter table 515-b (e.g., such that k0=0 becomes addressable for data scheduling). Accordingly, DCI received in slot 520-c may indicate same slot PDSCH scheduling (e.g., k0=0). BWP timer 525 may be an example of BWP timer 435 described with reference to FIG. 4. As such, it may be an example of a duration during which the UE 115 monitors for transmissions on BWP 510-b (e.g., which may represent a lower transmission power than BWP 510-a during slots 520-b and 520-c because of the lack of PDSCH). At an expiration of BWP timer 525 (e.g., or based on explicit DCI signaling), the UE 115 may switch to BWP 505 (e.g., after duration 530). For example, duration 530 may be based on timing parameter table 515-a (e.g., because of the transition to BWP 505). Thus, k0=1 and duration 530 may represent one slot. Once BWP 505 becomes the active BWP, k0 may be set to one slot (e.g., k0=1) to support microsleep operations.

A UE 115 may switch between BWP 505 and BWP 510 based on scheduling. For example, BWP 505 may be uses to support microsleep operations (e.g., low power BWP) and BWP 510 may be used (e.g., with k0=0 once BWP 510 becomes the active BWP) for data scheduling activity.

Various considerations for support of timing parameter management with two BWPs are included within the scope of the present disclosure. For example, during normal operation (e.g., non-wakeup operation), switching from BWP 505 to BWP 510 may incur a large k0 delay (e.g., even though the modem is already woken up). Such limitations may, for example, be addressed by allowing a UE 115 to infer a preferred timing parameter value following an active-mode cross-BWP scheduling DCI (e.g., allowing the UE 115 to infer k0=1). Additionally, aspects of the present disclosure may be supported by a scheduling restriction that only cross-BWP scheduling may be allowed for wakeup slots (e.g., slots at the beginning of some discontinuous reception cycle such as slot 520-a). Otherwise, a UE 115 may have to be prepared for same BWP scheduling with a smaller k0 (e.g., k0=1) based on timing parameter table 515-a (e.g., unless k0 is also configured to be large for timing parameter table 515-a).

Aspects of the DCI transmissions described above may apply to non-fallback DCI operation (e.g., because the BWP switch may only be supported with non-fallback DCI). If fallback DCI is supported in the wakeup slot (e.g., slot 520-a), the fallback DCI (e.g., at least for a cellular radio network temporary identifier (C-RNTI)) must also share the same timing parameter table 515 as the non-fallback DCI. Otherwise a UE 115 may have to be prepared for being scheduled with another set of k0 parameters (e.g., if fallback DCI uses a default table with {1, 2, 3, . . . 8} as possible k0 values, rendering power saving infeasible. Another way to address the fallback DCI usage is not to configure a common search space at all (e.g., and only have user-specific search space with non-fallback DCI support).

Figure 6:
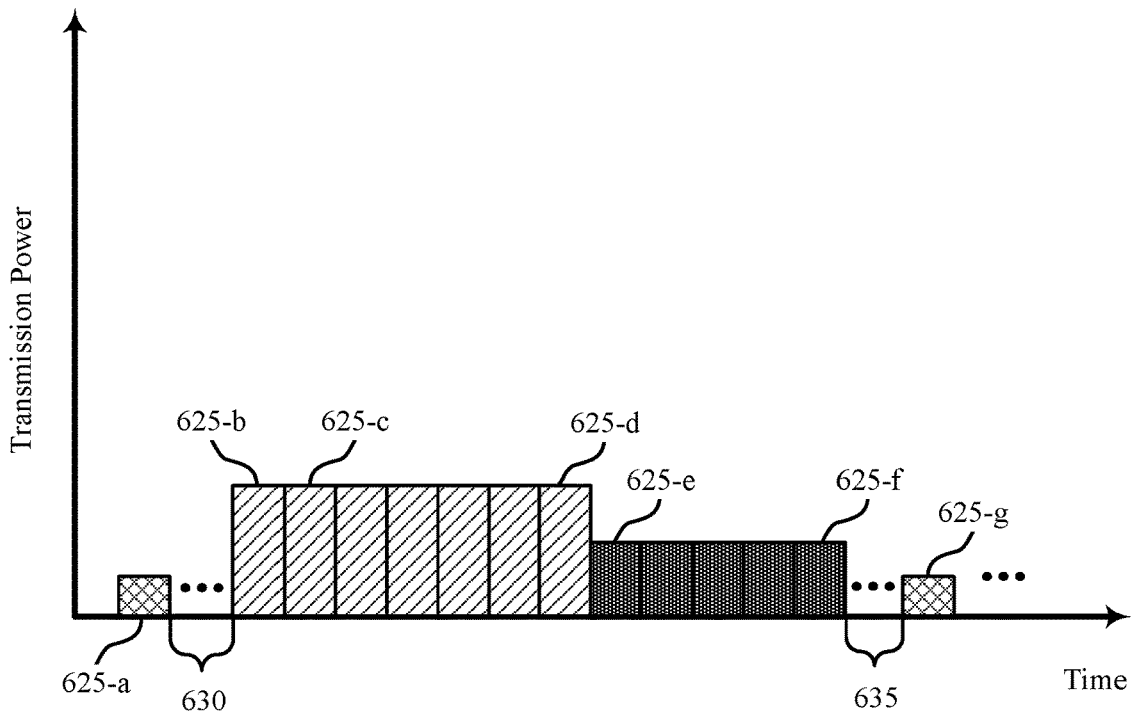

FIG. 6 illustrates an example of a transmission scheme 600 that supports timing parameter management for bandwidth part switching in accordance with aspects of the present disclosure. In some examples, transmission scheme 600 may implement aspects of wireless communications system 100. For example, transmission scheme 600 may illustrate aspects of communications between a base station 105 and a UE 115 over multiple (e.g., three) BWPs. For example, the base station 105 may configure the UE 115 with timing parameter table 620-a for BWP 605 (e.g., a default BWP, a narrowband BWP), timing parameter table 620-b for BWP 610 (e.g., a wideband BWP supporting same-slot scheduling), and timing parameter table 620-c for BWP 615 (e.g., a wideband BWP supporting cross-slot scheduling).

A base station 105 may transmit DCI over BWP 605 during slot 625-a, which DCI may indicate BWP 610 (e.g., cross-BWP scheduling) in a BWP ID bit field. Because the resource allocation field of the DCI in slot 625-a may be sized according to timing parameter table 620-a, the third row (e.g., k0=0) of timing parameter table 620-b may not be addressable by the resource allocation field. In some examples, k0=2 may be selected from timing parameter table 620-b (e.g., such that a duration 630 between slot 625-a and slot 625-b may be two slots). A UE 115 receiving the DCI may then receive PDSCH over BWP 610 in slot 625-b. Subsequently (e.g., in slot 625-c), k0=0 may be selected (e.g., because all rows of timing parameter table 620-b may be addressable). Accordingly, the UE 115 may receive the DCI scheduling PDSCH and the PDSCH itself both over BWP 610 in slot 625-c. Thus, BWP 610 may support same-slot scheduling.

In slot 625-d, the UE 115 may receive DCI over BWP 610 indicating a BWP switch (e.g., DCI containing a BWP ID field indicating BWP 615). The DCI in slot 625-d may index into timing parameter table 620-c. Because the resource allocation field of the DCI may contain two bits (e.g., based on timing parameter table 620-b containing three rows), a most significant bit of the resource allocation field may be dropped by UE 115 in interpreting the resource allocation field. That is, the UE 115 may use the least significant bit of the resource allocation field to distinguish between the two rows of timing parameter table 620-c. In the present example, the resource allocation field may indicate k0=1 such that the UE 115 determines that PDSCH over BWP 615 is contained in slot 625-e. BWP 615 may support cross-slot (e.g., k0=2 or k0=1) scheduling and may thus be associated with a lower transmission power cost than BWP 610. DCI transmitted over BWP 615 in slot 625-f may indicate BWP 605 and select k0=2 (e.g., such that duration 635 comprises two slots 625). Subsequently, the UE 115 may receive PDSCH over BWP 605 in slot 625-g based on the scheduling DCI received in slot 625-f. Because timing parameter table 620-a and timing parameter table 620-c have a same size, no transformation (e.g., truncation or zero-padding) for a resource allocation field may be needed when switching between BWP 605 and BWP 615.

Figure 7:
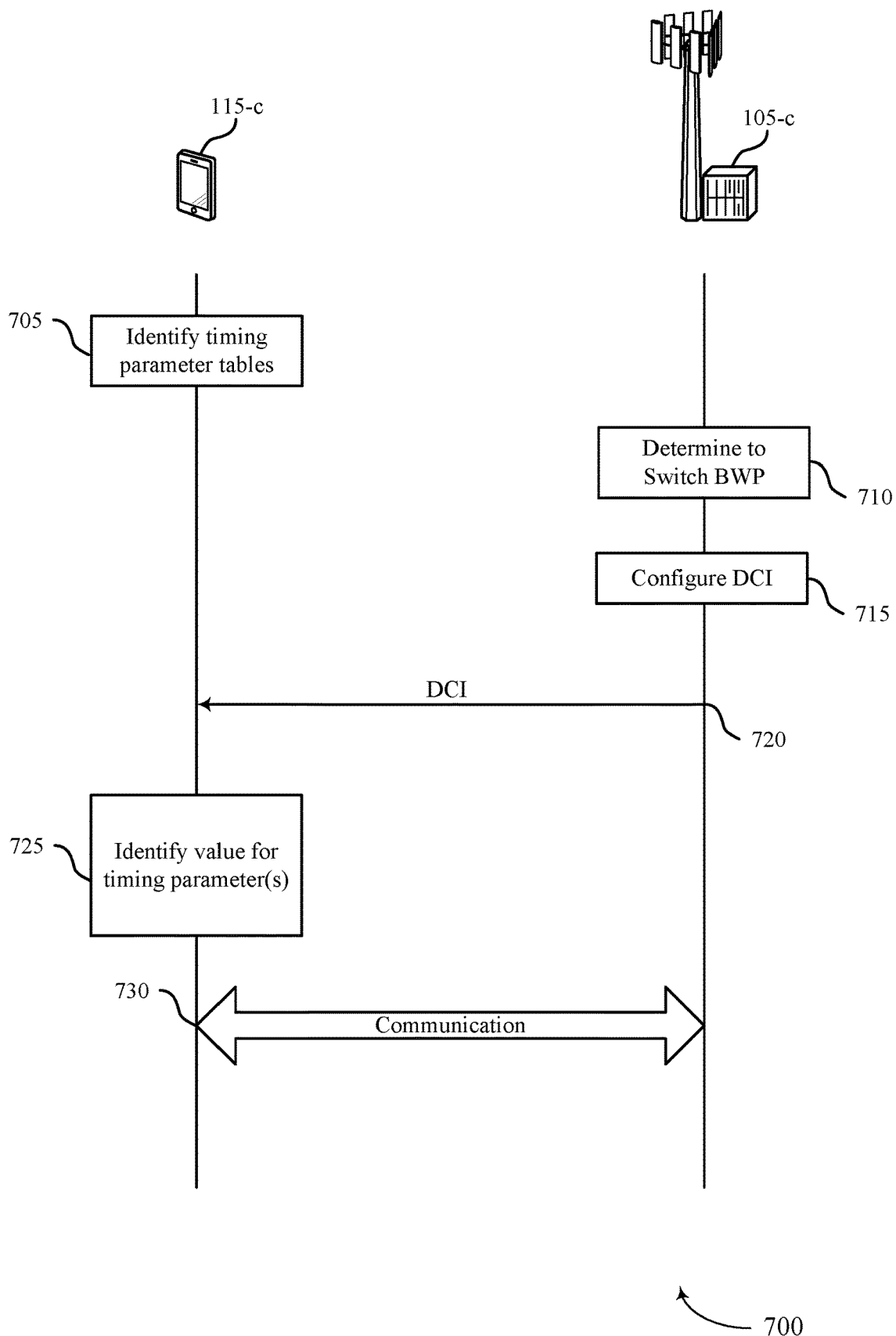
FIG. 7 illustrates an example of a process flow that supports timing parameter management for bandwidth part switching in accordance with aspects of the present disclosure.

FIG. 7 illustrates an example of a process flow 700 that supports timing parameter management for bandwidth part switching in accordance with aspects of the present disclosure. In some examples, process flow 700 may implement aspects of wireless communications system 100. For example, process flow 700 includes UE 115-c and base station 105-c, each of which may be an example of the corresponding devices described with reference to FIG. 1.

At 705, UE 115-c (e.g., and base station 105-c) may identify a set of timing parameter tables that each define one or more potential values for a timing parameter (e.g., k0, k2) associated with a timing between a last symbol of a DCI transmission and a slot containing data communication between the devices. For example, the set of timing parameter tables may include a first timing parameter table associated with a first BWP and a second timing parameter table associated with a second BWP. In some cases, the set of timing parameter tables may be identified based on signaling (e.g., RRC signaling) configuring the tables.

In some cases, the first timing parameter table has a first number of rows and the second timing parameter table has a different number of rows. In some cases, the set of timing parameter tables further includes a third timing parameter table associated with downlink transmissions over the first BWP while the first timing parameter table is associated with uplink transmissions over the first BWP. In some cases, the first BWP has a first numerology (e.g., a first tone spacing) and the second BWP has a second numerology (e.g., a different tone spacing), and the potential values for the timing parameters indicated by the timing parameter tables may be based at least in part on the respective tone spacings. That is, the tone spacing may influence a duration of a slot, which may in turn influence an interpretation of the timing parameters.

At 710, base station 105-c may identify a trigger for switching communications with UE 115-c from the first BWP to the second BWP. It is to be understood that prior to 710, the first BWP may represent a currently active BWP (e.g., a wakeup BWP, a default BWP, or the like). In some cases, the trigger may include a type of data to be transmitted, an amount of data to be transmitted, an amount of traffic associated with one or both of the BWPs, or the like.

At 715, base station 105-c may select a value for a timing parameter based at least in part on the trigger and the second timing parameter table. That is, base station 105-c may configure DCI to include a BWP switching indication (e.g., a BWP ID for the second BWP) as well as a resource allocation field indicating a value for the timing parameter from the second timing parameter table. In some cases, the size of the resource allocation field (e.g., and thus the value selected from the second timing parameter table) may be based in part on the number of row in the first timing parameter table.

At 720, base station 105-c may transmit (e.g., and UE 115-c may receive) the DCI over the first BWP. The DCI may activate the second BWP and include the resource allocation bit field indicating the value for the timing parameter.

At 725, UE 115-c may identify a value for the timing parameter based on the resource allocation bit field and the second timing parameter table. For example, the resource allocation bit field may provide an index into the second timing parameter table as described above with reference to FIGS. 4 and 5.

At 730, UE 115-c and base station 105-c may communicate over the second BWP in accordance with the value for the timing parameter. For example, UE 115-c may receive a PDSCH transmission from (e.g., or transmit a PUSCH transmission to) base station 105-c, where a timing of the transmission may be based on the value for the timing parameter.

Figure 8:
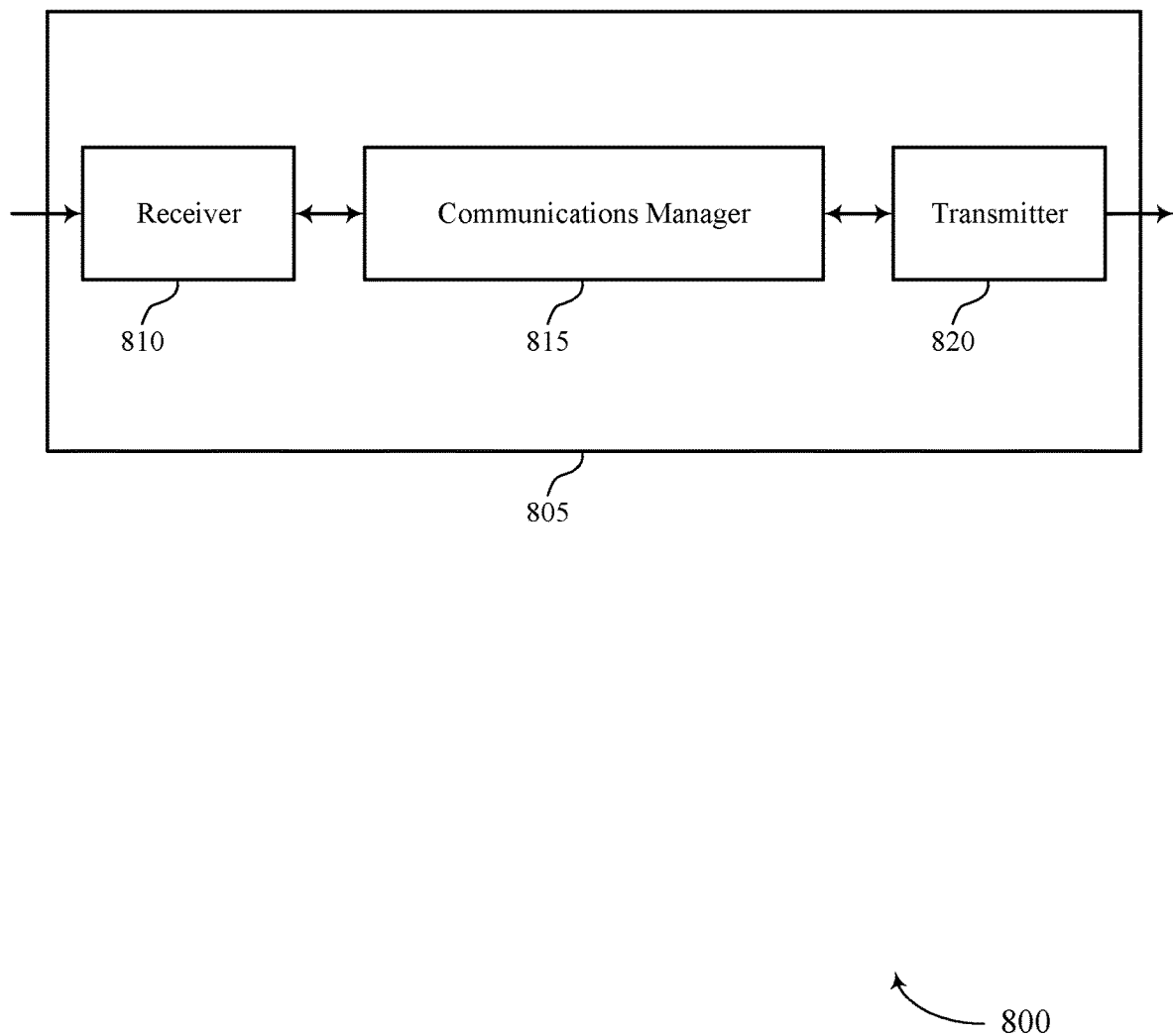
FIGS. 8 and 9 show block diagrams of devices that support timing parameter management for bandwidth part switching in accordance with aspects of the present disclosure.

FIG. 8 shows a block diagram 800 of a device 805 that supports timing parameter management for bandwidth part switching in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to timing parameter management for bandwidth part switching, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a set of timing parameter tables that each define one or more potential values for a timing parameter associated with a timing between receipt, from a base station, of DCI and subsequent communication with the base station, the set of timing parameter tables including at least a first timing parameter table associated with a first BWP and a second timing parameter table associated with a second BWP. The communications manager 815 may receive, over the first BWP, a DCI transmission that activates the second BWP, the DCI transmission including a resource allocation bit field indexing at least a subset of the second timing parameter table, where a size of the resource allocation bit field is based on a configuration of the first BWP. The communications manager 815 may identify a value for the timing parameter based on the second timing parameter table and the size of the resource allocation bit field. The communications manager 815 may communicate with the base station over the second BWP in accordance with the value for the timing parameter. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
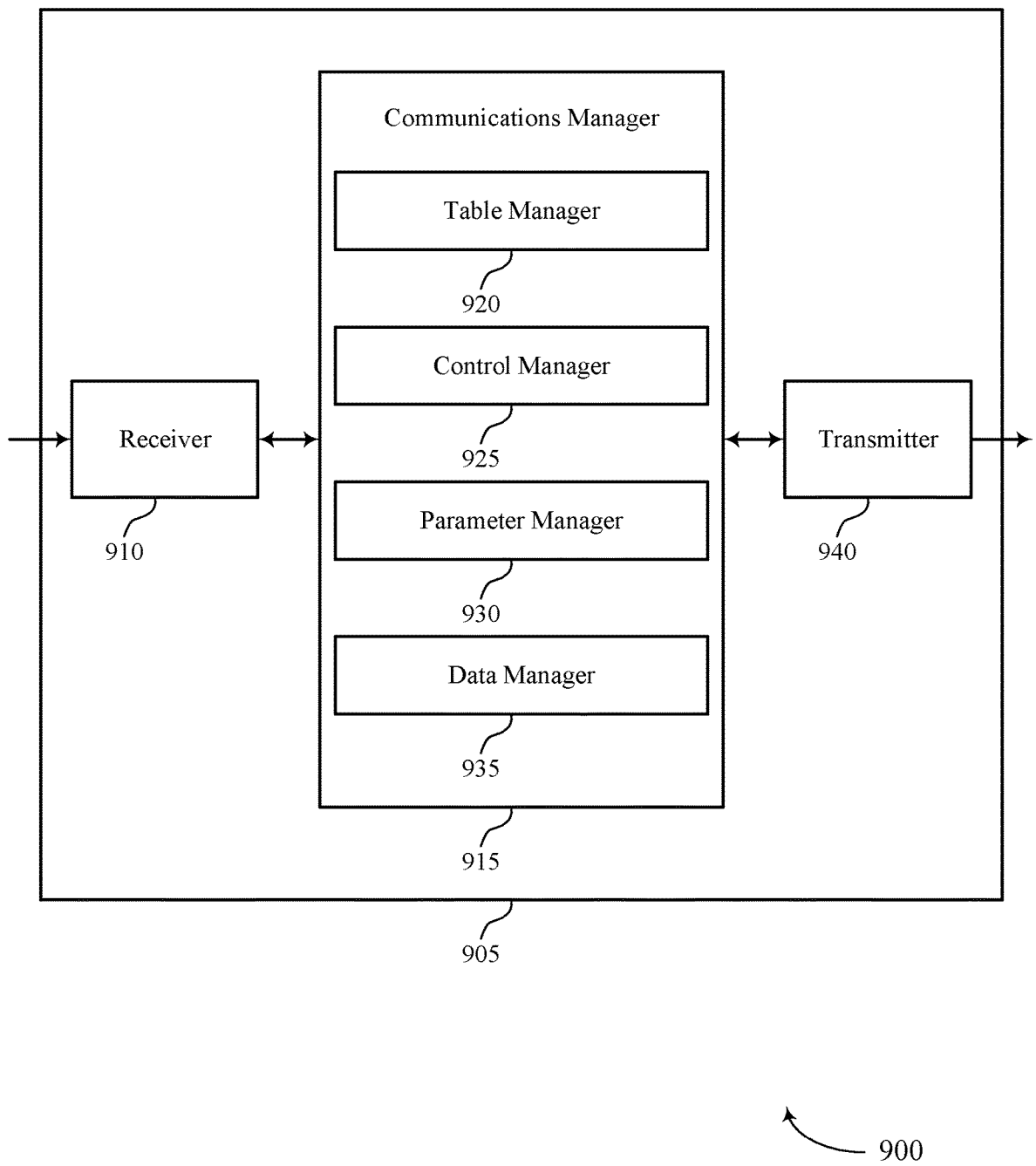

FIG. 9 shows a block diagram 900 of a device 905 that supports timing parameter management for bandwidth part switching in accordance with aspects of the present disclosure. The device 905 may be an example of aspects of a device 805 or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to timing parameter management for bandwidth part switching, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a table manager 920, a control manager 925, a parameter manager 930, and a data manager 935. The communications manager 915 may be an example of aspects of the communications manager 1110 described herein.

The table manager 920 may identify a set of timing parameter tables that each define one or more potential values for a timing parameter associated with a timing between receipt, from a base station, of DCI and subsequent communication with the base station, the set of timing parameter tables including at least a first timing parameter table associated with a first BWP and a second timing parameter table associated with a second BWP. The control manager 925 may receive, over the first BWP, a DCI transmission that activates the second BWP, the DCI transmission including a resource allocation bit field indexing at least a subset of the second timing parameter table, where a size of the resource allocation bit field is based on a configuration of the first BWP. The parameter manager 930 may identify a value for the timing parameter based on the second timing parameter table and the size of the resource allocation bit field. The data manager 935 may communicate with the base station over the second BWP in accordance with the value for the timing parameter.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
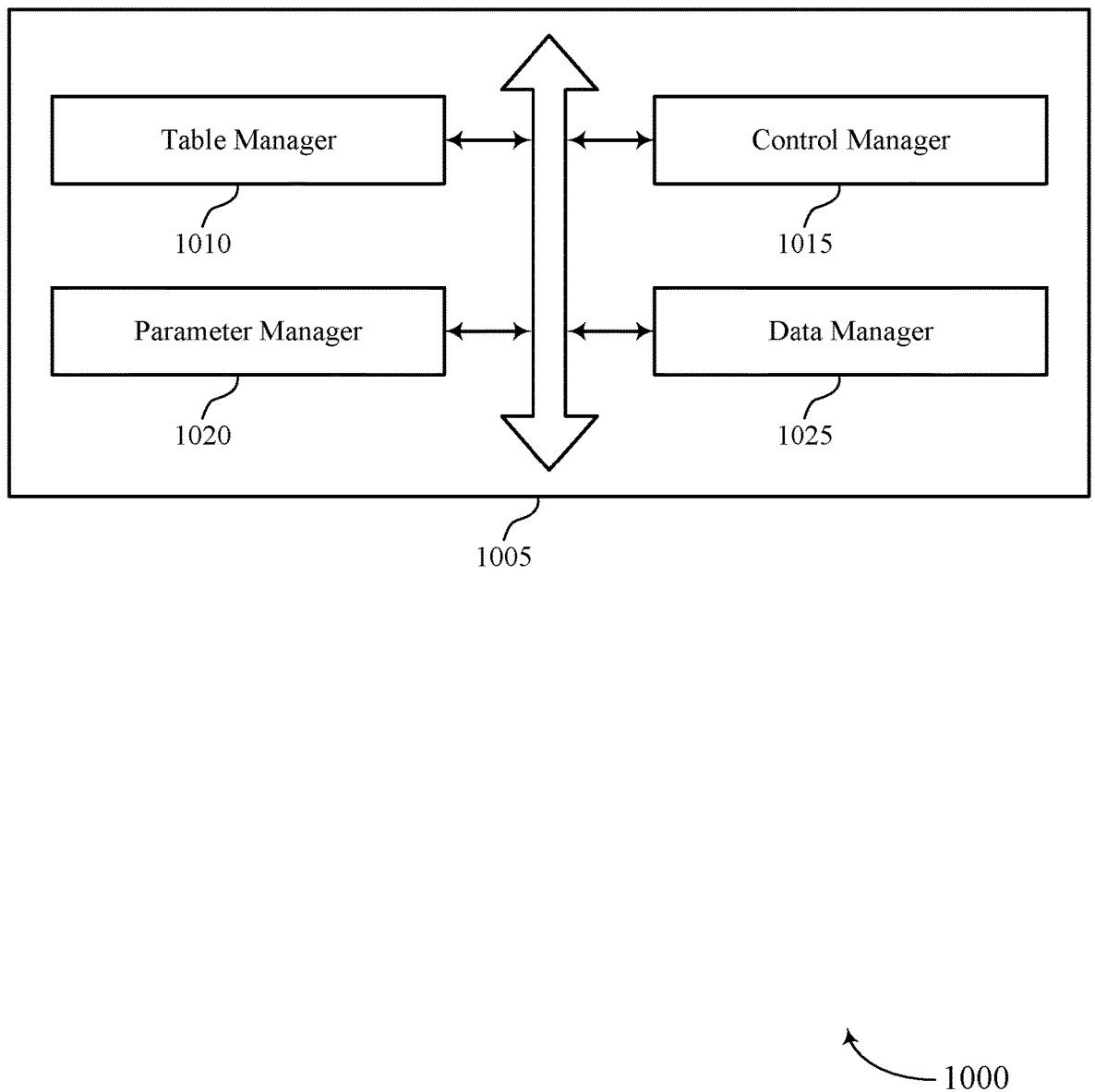
FIG. 10 shows a block diagram of a device that supports timing parameter management for bandwidth part switching in accordance with aspects of the present disclosure.

FIG. 10 shows a block diagram 1000 of a communications manager 1005 that supports timing parameter management for bandwidth part switching in accordance with aspects of the present disclosure. The communications manager 1005 may be an example of aspects of a communications manager 815, a communications manager 915, or a communications manager 1110 described herein. The communications manager 1005 may include a table manager 1010, a control manager 1015, a parameter manager 1020, and a data manager 1025. Each of these modules may communicate, directly or indirectly, with one another (e.g., via one or more buses).

The table manager 1010 may identify a set of timing parameter tables that each define one or more potential values for a timing parameter associated with a timing between receipt, from a base station, of DCI and subsequent communication with the base station, the set of timing parameter tables including at least a first timing parameter table associated with a first BWP and a second timing parameter table associated with a second BWP. In some examples, the table manager 1010 may receive at least one of the set of timing parameter tables from the base station via RRC signaling. In some cases, the first timing parameter table includes a first set of rows and the second timing parameter table includes a second set of rows, each row of the first set of rows and the second set of rows indicating a potential value for the timing parameter. In some such cases, the size of the resource allocation bit field is based on a number of rows in the first set of rows.

In some cases, the first timing parameter table is associated with uplink transmissions over the first BWP, and the set of timing parameter tables further includes a third timing parameter table associated with downlink transmissions over the first BWP. In some cases, the first BWP has a first tone spacing and the second BWP has a second tone spacing, where the potential values for the timing parameter of the first timing parameter table are based on the first tone spacing and the potential values for the timing parameter of the second timing parameter table are based on the second tone spacing. In some cases, the first BWP is associated with a lower transmission power than the second BWP.

The control manager 1015 may receive, over the first BWP, a DCI transmission that activates the second BWP, the DCI transmission including a resource allocation bit field indexing at least a subset of the second timing parameter table, where a size of the resource allocation bit field is based on a configuration of the first BWP. In some examples, the control manager 1015 may identify a format for the DCI transmission. In some examples, the control manager 1015 may select the second timing parameter table from the set of timing parameter tables based on the format of the DCI transmission. In some cases, the DCI transmission includes a BWP identification field that activates the second BWP.

The parameter manager 1020 may identify a value for the timing parameter based on the second timing parameter table and the size of the resource allocation bit field. In some examples, the parameter manager 1020 may identify a subset of bits in the resource allocation bit field, the subset of bits indexing a row of the second set of rows. In some examples, the parameter manager 1020 may determine the value for the timing parameter based on the indexed row of the second set of rows. In some examples, the parameter manager 1020 may identify a subset of the second set of rows that are addressable by the resource allocation bit field. In some examples, the parameter manager 1020 may identify a row of the subset of the second set of rows indexed by the resource allocation bit field. In some examples, the parameter manager 1020 may determine the value for the timing parameter based on the indexed row. In some cases, the subset of the second set of rows includes a lowest-indexed row of the second set of rows, and the lowest-indexed row corresponds to a preferred value of the timing parameter for switching to the second BWP. In some cases, the subset of the second set of rows includes a largest value of the potential values for the timing parameter from the second plurality of rows, where the values of the timing parameter are ordered from the larger values of the timing parameter to the smaller values of the timing parameter, for switching to the second BWP.

In some cases, the subset of the second set of rows includes at least one row corresponding to a preferred value of the timing parameter for communicating in the second BWP. In some cases, the preferred value of the timing parameter includes a first value for wakeup communications, a second value for data communications, or a third value for micro-sleep communications.

The data manager 1025 may communicate with the base station over the second BWP in accordance with the value for the timing parameter. In some examples, the data manager 1025 may receive a PDSCH transmission. In some examples, the data manager 1025 may transmit a PUSCH transmission.

Figure 11:
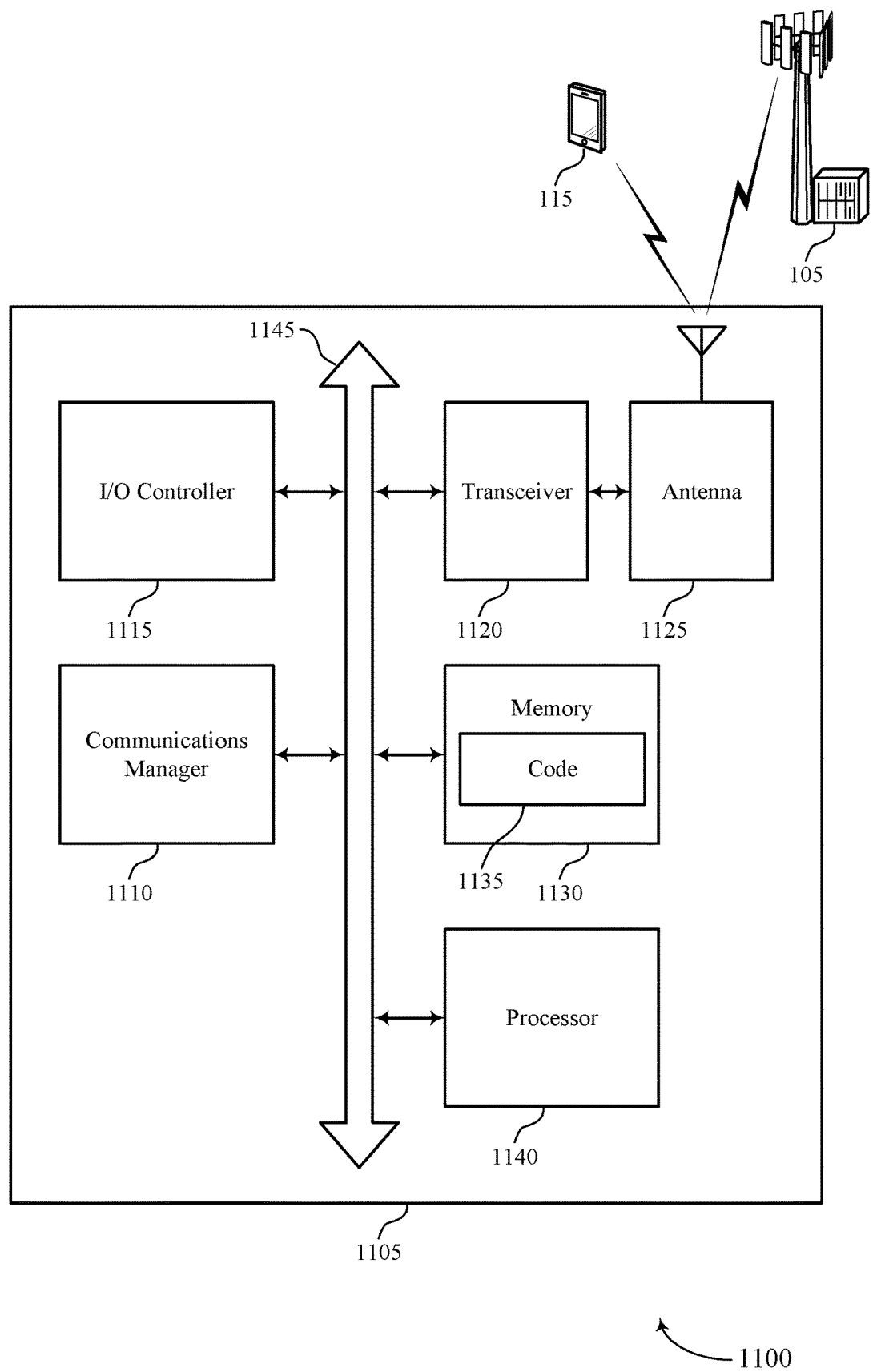
FIG. 11 shows a diagram of a system including a device that supports timing parameter management for bandwidth part switching in accordance with aspects of the present disclosure.

FIG. 11 shows a diagram of a system 1100 including a device 1105 that supports timing parameter management for bandwidth part switching in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a set of timing parameter tables that each define one or more potential values for a timing parameter associated with a timing between receipt, from a base station, of DCI and subsequent communication with the base station, the set of timing parameter tables including at least a first timing parameter table associated with a first BWP and a second timing parameter table associated with a second BWP. The communications manager 1110 may receive, over the first BWP, a DCI transmission that activates the second BWP, the DCI transmission including a resource allocation bit field indexing at least a subset of the second timing parameter table, where a size of the resource allocation bit field is based on a configuration of the first BWP. The communications manager 1110 may identify a value for the timing parameter based on the second timing parameter table and the size of the resource allocation bit field. The communications manager 1110 may communicate with the base station over the second BWP in accordance with the value for the timing parameter.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting timing parameter management for bandwidth part switching).

The code 1135 may include instructions to implement aspects of the present disclosure, including instructions to support wireless communication. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
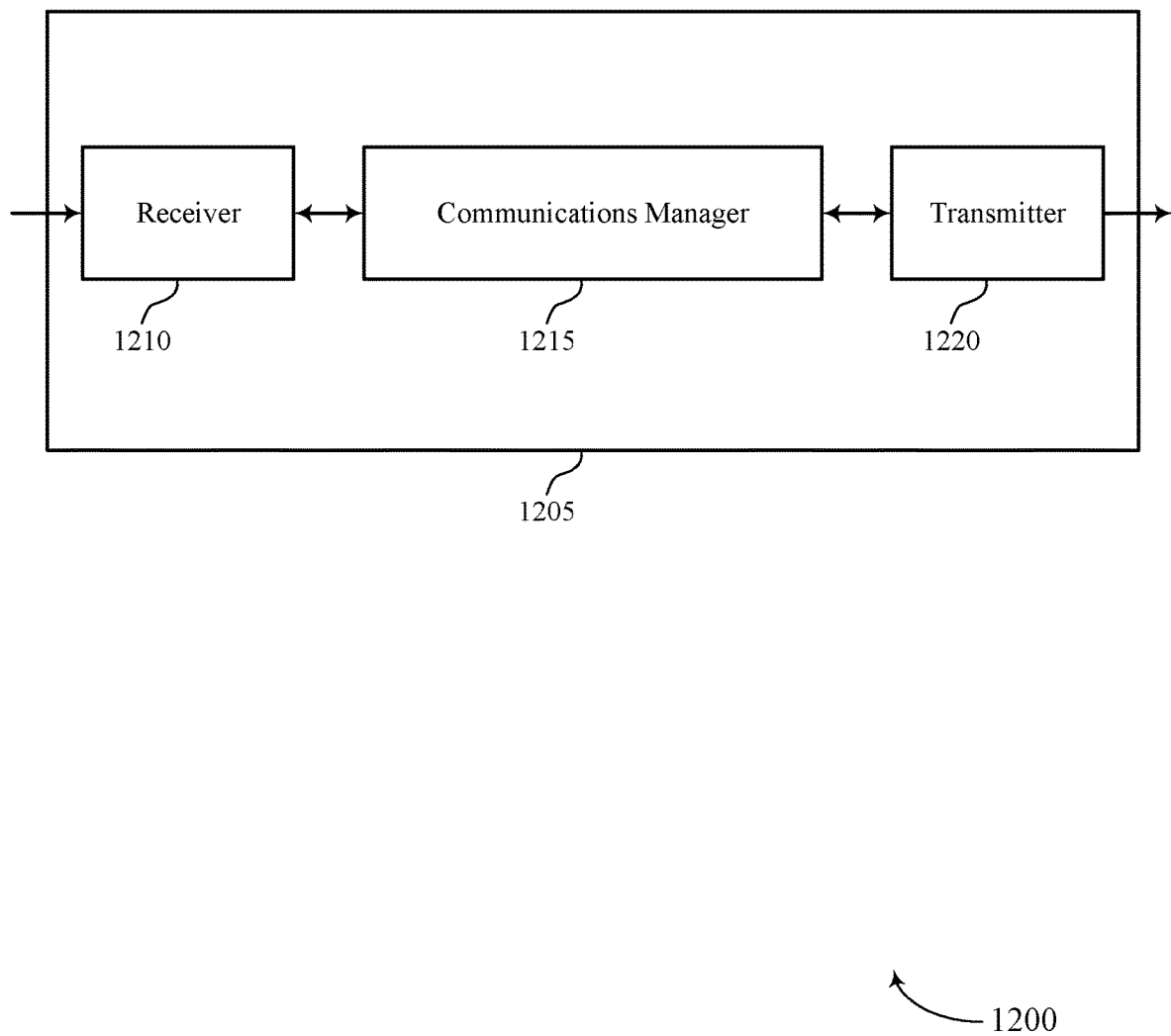
FIGS. 12 and 13 show block diagrams of devices that support timing parameter management for bandwidth part switching in accordance with aspects of the present disclosure.

FIG. 12 shows a block diagram 1200 of a device 1205 that supports timing parameter management for bandwidth part switching in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to timing parameter management for bandwidth part switching, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a set of timing parameter tables that each define one or more potential values for a timing parameter associated with a timing between transmission, to a UE, of DCI and subsequent communication with the UE, the set of timing parameter tables including at least a first timing parameter table associated with a first BWP and a second timing parameter table associated with a second BWP. The communications manager 1215 may identify a trigger for switching communications with the UE from the first BWP to the second BWP. The communications manager 1215 may select a value for the timing parameter based on the trigger and the second timing parameter table. The communications manager 1215 may transmit, over the first BWP, a DCI transmission that activates the second BWP, the DCI transmission including a resource allocation bit field indicating the value for the timing parameter, where a size of the resource allocation bit field is based on a configuration of the first BWP. The communications manager 1215 may communicate with the UE over the second BWP in accordance with the value for the timing parameter. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
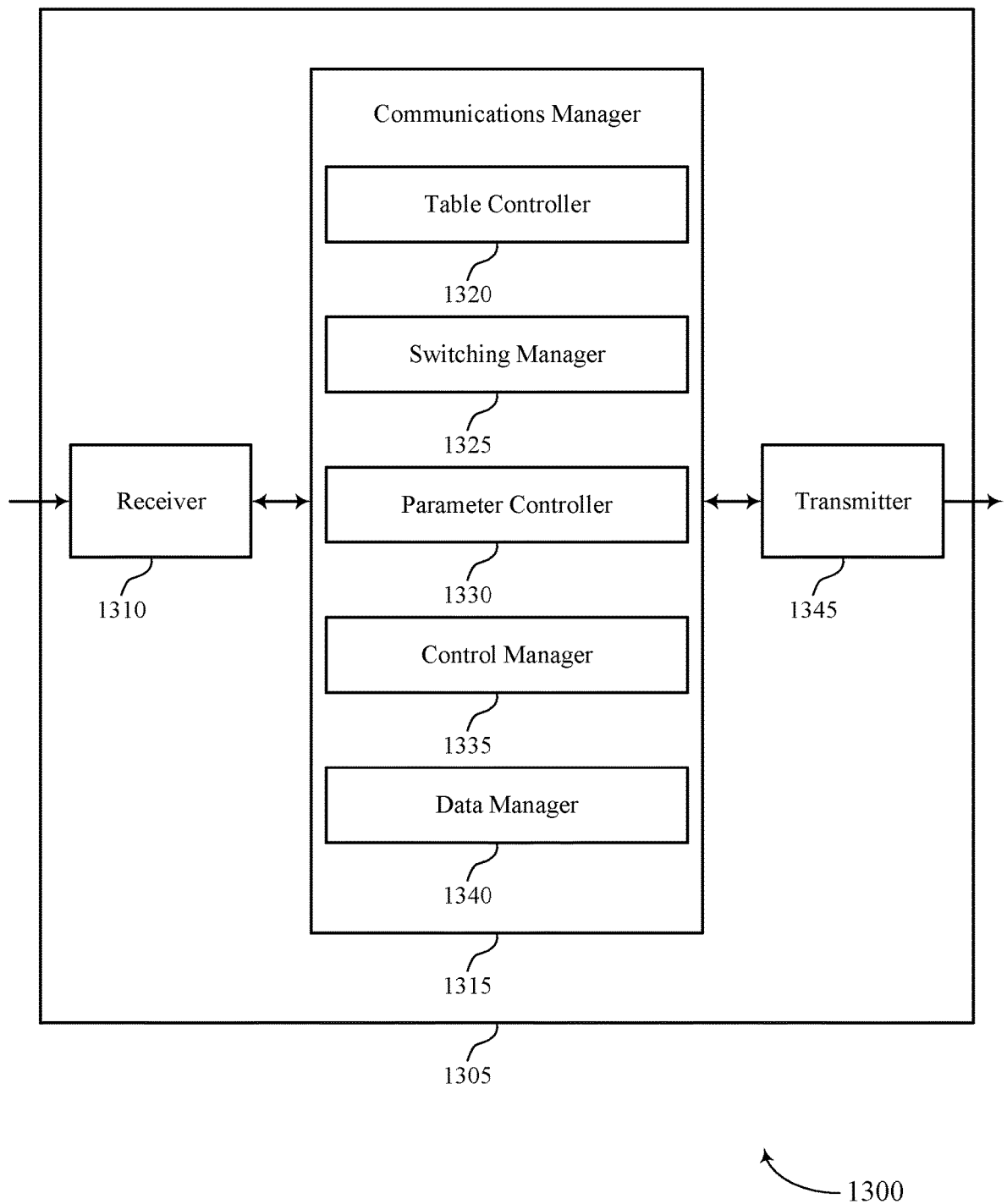

FIG. 13 shows a block diagram 1300 of a device 1305 that supports timing parameter management for bandwidth part switching in accordance with aspects of the present disclosure. The device 1305 may be an example of aspects of a device 1205 or a base station 115 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to timing parameter management for bandwidth part switching, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a table controller 1320, a switching manager 1325, a parameter controller 1330, a control manager 1335, and a data manager 1340. The communications manager 1315 may be an example of aspects of the communications manager 1510 described herein.

The table controller 1320 may identify a set of timing parameter tables that each define one or more potential values for a timing parameter associated with a timing between transmission, to a UE, of DCI and subsequent communication with the UE, the set of timing parameter tables including at least a first timing parameter table associated with a first BWP and a second timing parameter table associated with a second BWP. The switching manager 1325 may identify a trigger for switching communications with the UE from the first BWP to the second BWP. The parameter controller 1330 may select a value for the timing parameter based on the trigger and the second timing parameter table. The control manager 1335 may transmit, over the first BWP, a DCI transmission that activates the second BWP, the DCI transmission including a resource allocation bit field indicating the value for the timing parameter, where a size of the resource allocation bit field is based on a configuration of the first BWP. The data manager 1340 may communicate with the UE over the second BWP in accordance with the value for the timing parameter.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
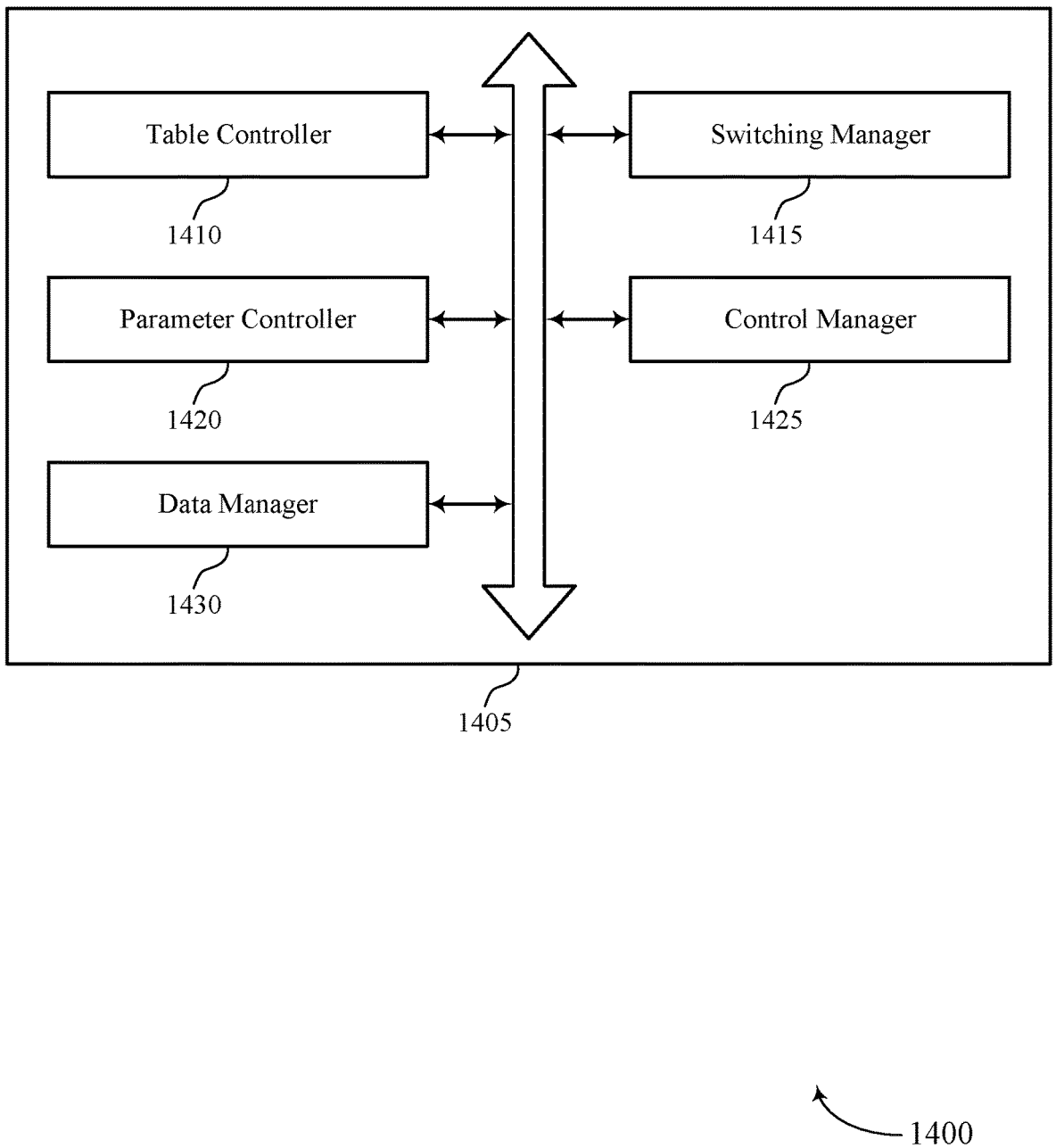
FIG. 14 shows a block diagram of a device that supports timing parameter management for bandwidth part switching in accordance with aspects of the present disclosure.

FIG. 14 shows a block diagram 1400 of a communications manager 1405 that supports timing parameter management for bandwidth part switching in accordance with aspects of the present disclosure. The communications manager 1405 may be an example of aspects of a communications manager 1215, a communications manager 1315, or a communications manager 1510 described herein. The communications manager 1405 may include a table controller 1410, a switching manager 1415, a parameter controller 1420, a control manager 1425, and a data manager 1430. Each of these modules may communicate, directly or indirectly, with one another (e.g., via one or more buses).

The table controller 1410 may identify a set of timing parameter tables that each define one or more potential values for a timing parameter associated with a timing between transmission, to a UE, of DCI and subsequent communication with the UE, the set of timing parameter tables including at least a first timing parameter table associated with a first BWP and a second timing parameter table associated with a second BWP. In some examples, the table controller 1410 may transmit at least one of the set of timing parameter tables to the UE via RRC signaling. In some cases, the first timing parameter table includes a first set of rows and the second timing parameter table includes a second set of rows, each row of the first set of rows and the second set of rows indicating a potential value for the timing parameter. In some cases, the size of the resource allocation bit field is based on a number of rows in the first set of rows. In some cases, the first timing parameter table is associated with uplink transmissions over the first BWP, and the set of timing parameter tables further includes a third timing parameter table associated with downlink transmissions over the first BWP. In some cases, the first BWP has a first tone spacing, and the second BWP has a second tone spacing. In some cases, the potential values for the timing parameter of the first timing parameter table are based on the first tone spacing, and the potential values for the timing parameter of the second timing parameter table are based on the second tone spacing. In some cases, the first BWP is associated with a lower transmission power than the second BWP.

The switching manager 1415 may identify a trigger for switching communications with the UE from the first BWP to the second BWP. The parameter controller 1420 may select a value for the timing parameter based on the trigger and the second timing parameter table. In some examples, the parameter controller 1420 may identify a subset of the second set of rows that are addressable by the resource allocation bit field. In some examples, the parameter controller 1420 may select the value for the timing parameter based on the subset of the second set of rows. In some cases, the subset of the second set of rows includes a lowest-indexed row of the second set of rows, and the lowest-indexed row corresponds to a preferred value of the timing parameter for switching to the second BWP. In some cases, the subset of the second set of rows includes a set of lowest-indexed rows of the second plurality of rows, the set of lowest-indexed rows corresponding to a set of values of the timing parameter, where the values of the timing parameter are ordered from the largest value of the timing parameter to the smallest value of the timing parameter, for switching to the second BWP.

In some cases, the subset of the second set of rows includes at least one row corresponding to a preferred value of the timing parameter for communicating in the second BWP. In some cases, the preferred value of the timing parameter includes a first value for wakeup communications, a second value for data communications, or a third value for micro-sleep communications.

The control manager 1425 may transmit, over the first BWP, a DCI transmission that activates the second BWP, the DCI transmission including a resource allocation bit field indicating the value for the timing parameter, where a size of the resource allocation bit field is based on a configuration of the first BWP. In some examples, the control manager 1425 may zero-pad the resource allocation bit field. In some examples, the control manager 1425 may identify a format for the DCI transmission based on the trigger. In some cases, the DCI transmission includes a BWP identification field that activates the second BWP.

The data manager 1430 may communicate with the UE over the second BWP in accordance with the value for the timing parameter. In some examples, the data manager 1430 may transmit a PDSCH transmission. In some examples, the data manager 1430 may receive a PUSCH transmission.

Figure 15:
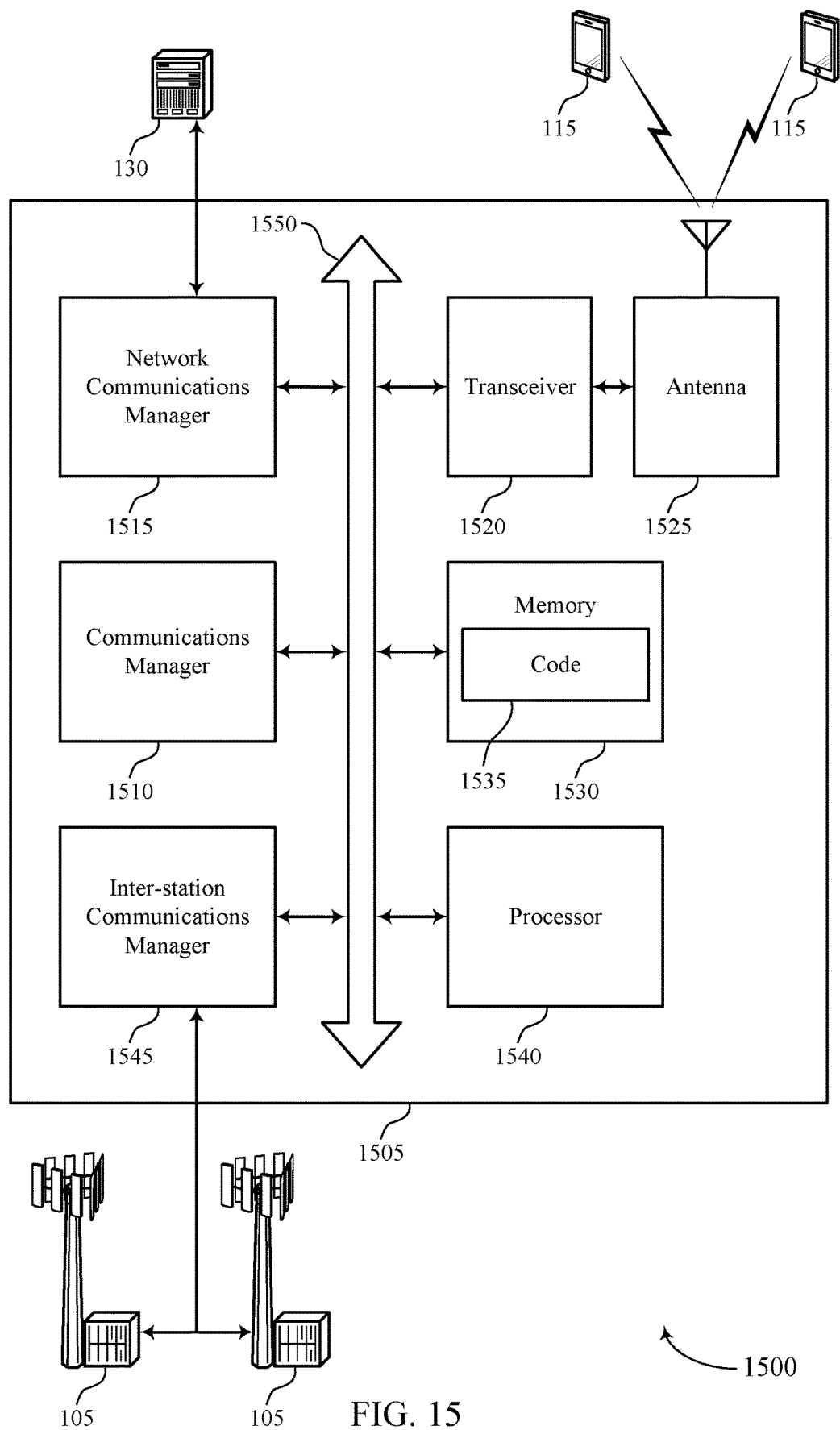
FIG. 15 shows a diagram of a system including a device that supports timing parameter management for bandwidth part switching in accordance with aspects of the present disclosure.

FIG. 15 shows a diagram of a system 1500 including a device 1505 that supports timing parameter management for bandwidth part switching in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a set of timing parameter tables that each define one or more potential values for a timing parameter associated with a timing between transmission, to a UE, of DCI and subsequent communication with the UE, the set of timing parameter tables including at least a first timing parameter table associated with a first BWP and a second timing parameter table associated with a second BWP. The communications manager 1510 may identify a trigger for switching communications with the UE from the first BWP to the second BWP. The communications manager 1510 may select a value for the timing parameter based on the trigger and the second timing parameter table. The communications manager 1510 may transmit, over the first BWP, a DCI transmission that activates the second BWP, the DCI transmission including a resource allocation bit field indicating the value for the timing parameter, where a size of the resource allocation bit field is based on a configuration of the first BWP. The communications manager 1510 may communicate with the UE over the second BWP in accordance with the value for the timing parameter.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device to perform various functions (e.g., functions or tasks supporting timing parameter management for bandwidth part switching).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communication. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
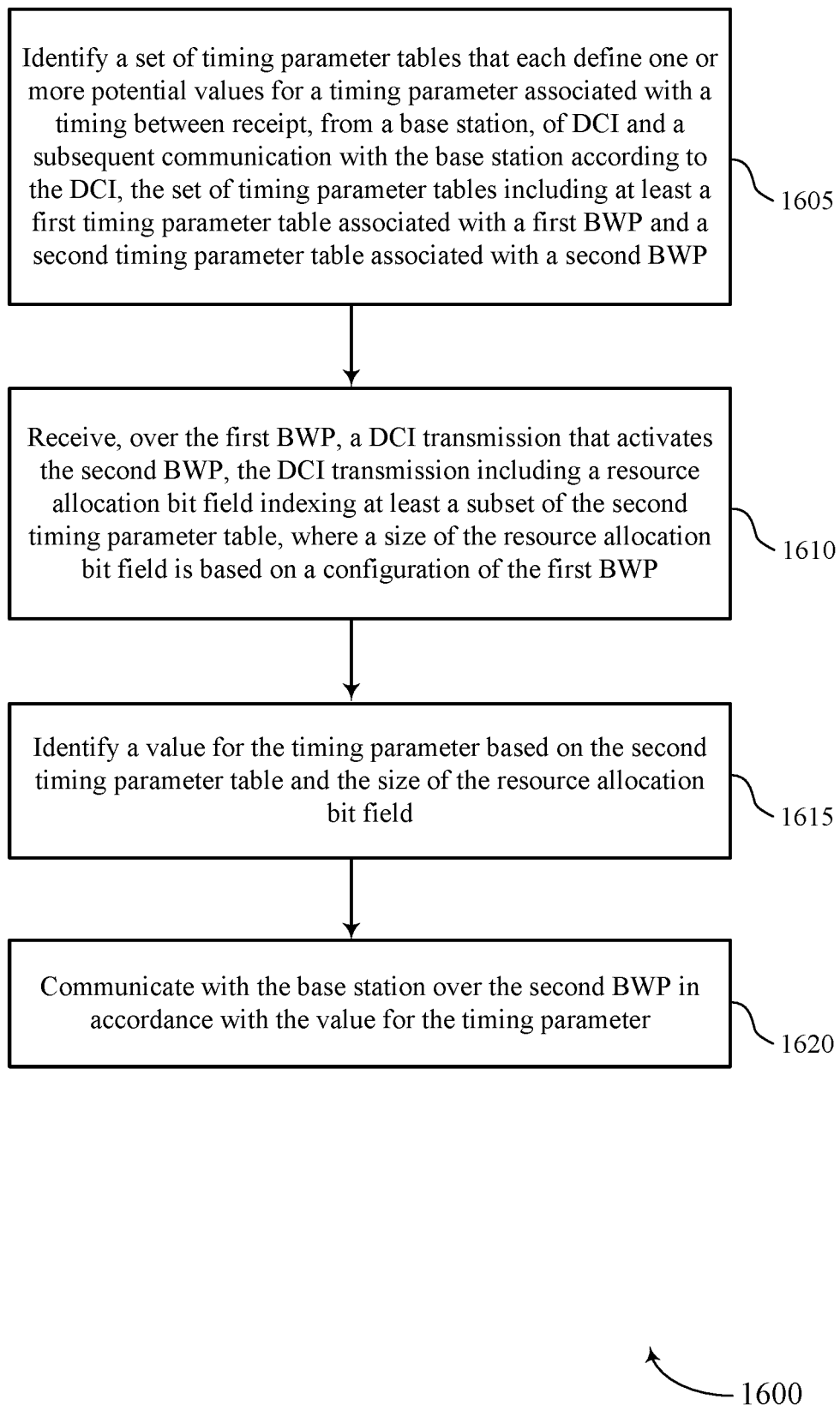
FIGS. 16 and 17 show flowcharts illustrating methods that support timing parameter management for bandwidth part switching in accordance with aspects of the present disclosure.

FIG. 16 shows a flowchart illustrating a method 1600 that supports timing parameter management for bandwidth part switching in accordance with aspects of the present disclosure. The operations of method 1600 may be implemented by a UE 115 or its components as described herein. For example, the operations of method 1600 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1605, the UE may identify a set of timing parameter tables that each define one or more potential values for a timing parameter associated with a timing between receipt, from a base station, of DCI and a subsequent communication with the base station according to the DCI, the set of timing parameter tables including at least a first timing parameter table associated with a first BWP and a second timing parameter table associated with a second BWP. The operations of 1605 may be performed according to the methods described herein. In some examples, aspects of the operations of 1605 may be performed by a table manager as described with reference to FIGS. 8 to 11.

At 1610, the UE may receive, over the first BWP, a DCI transmission that activates the second BWP, the DCI transmission including a resource allocation bit field indexing at least a subset of the second timing parameter table, where a size of the resource allocation bit field is based on a configuration of the first BWP. The operations of 1610 may be performed according to the methods described herein. In some examples, aspects of the operations of 1610 may be performed by a control manager as described with reference to FIGS. 8 to 11.

At 1615, the UE may identify a value for the timing parameter based on the second timing parameter table and the size of the resource allocation bit field. The operations of 1615 may be performed according to the methods described herein. In some examples, aspects of the operations of 1615 may be performed by a parameter manager as described with reference to FIGS. 8 to 11.

At 1620, the UE may communicate with the base station over the second BWP in accordance with the value for the timing parameter. The operations of 1620 may be performed according to the methods described herein. In some examples, aspects of the operations of 1620 may be performed by a data manager as described with reference to FIGS. 8 to 11.

Figure 17:
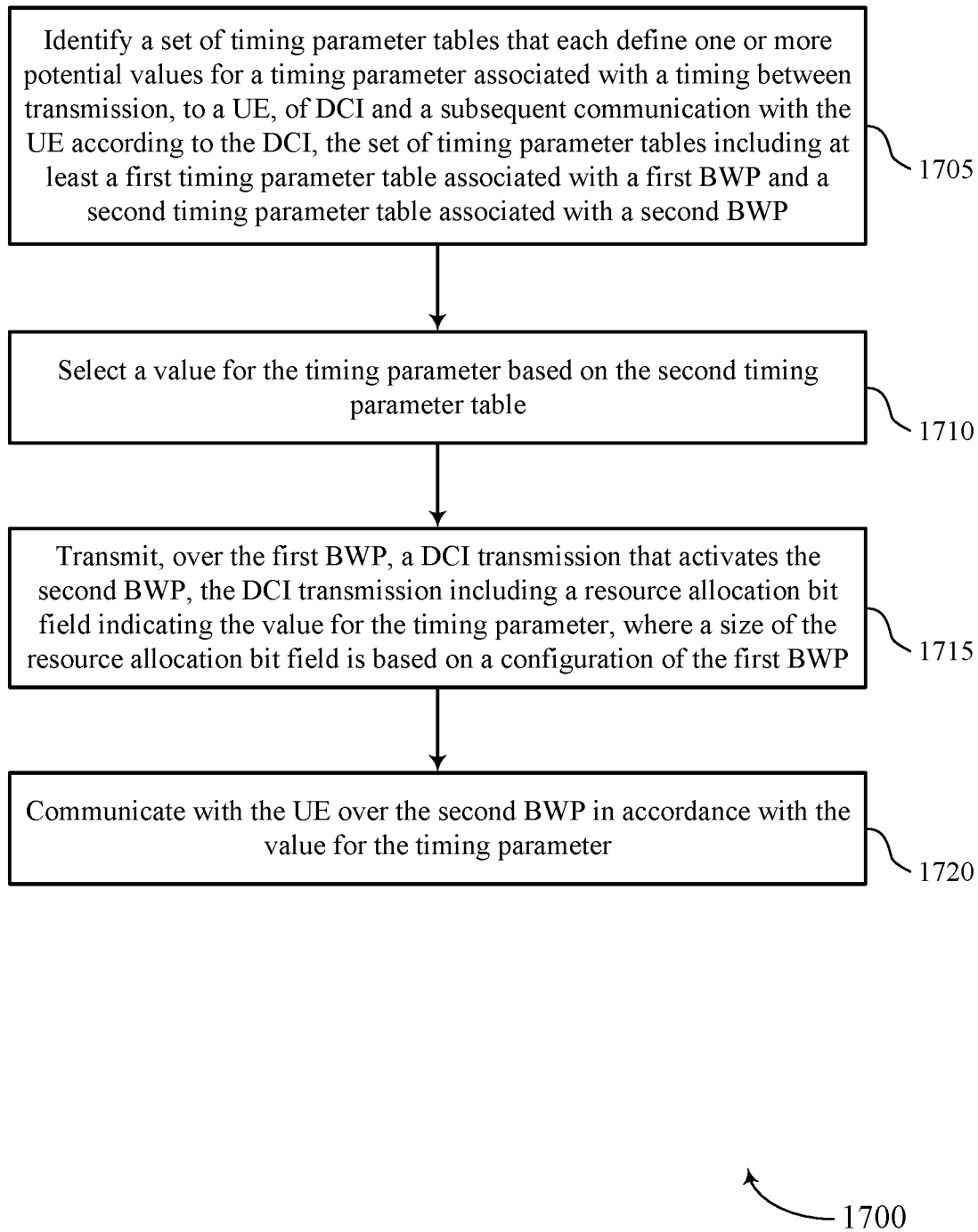

FIG. 17 shows a flowchart illustrating a method 1700 that supports timing parameter management for bandwidth part switching in accordance with aspects of the present disclosure. The operations of method 1700 may be implemented by a base station 105 or its components as described herein. For example, the operations of method 1700 may be performed by a communications manager as described with reference to FIGS. 12 to 15. In some examples, a base station may execute a set of instructions to control the functional elements of the base station to perform the functions described below. Additionally or alternatively, a base station may perform aspects of the functions described below using special-purpose hardware.

At 1705, the base station may identify a set of timing parameter tables that each define one or more potential values for a timing parameter associated with a timing between transmission, to a UE, of DCI and a subsequent communication with the UE according to the DCI, the set of timing parameter tables including at least a first timing parameter table associated with a first BWP and a second timing parameter table associated with a second BWP. The operations of 1705 may be performed according to the methods described herein. In some examples, aspects of the operations of 1705 may be performed by a table controller as described with reference to FIGS. 12 to 15.

At 1710, the base station may select a value for the timing parameter based on the second timing parameter table. The operations of 1710 may be performed according to the methods described herein. In some examples, aspects of the operations of 1710 may be performed by a parameter controller as described with reference to FIGS. 12 to 15.

At 1715, the base station may transmit, over the first BWP, a DCI transmission that activates the second BWP, the DCI transmission including a resource allocation bit field indicating the value for the timing parameter, where a size of the resource allocation bit field is based on a configuration of the first BWP. The operations of 1715 may be performed according to the methods described herein. In some examples, aspects of the operations of 1715 may be performed by a control manager as described with reference to FIGS. 12 to 15.

At 1720, the base station may communicate with the UE over the second BWP in accordance with the value for the timing parameter. The operations of 1720 may be performed according to the methods described herein. In some examples, aspects of the operations of 1720 may be performed by a data manager as described with reference to FIGS. 12 to 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a plurality of timing parameter tables that each define one or more potential values for a timing parameter associated with a timing between receipt, from a base station, of downlink control information (DCI) and a subsequent communication with the base station according to the DCI, the plurality of timing parameter tables comprising at least a first timing parameter table associated with a first bandwidth part (BWP) and a second timing parameter table associated with a second BWP,
    wherein the first timing parameter table comprises a first plurality of rows and the second timing parameter table comprises a second plurality of rows, each row of the first plurality of rows and the second plurality of rows indicating a potential value for the timing parameter;
    receiving, over the first BWP, a DCI transmission that activates the second BWP, the DCI transmission comprising a resource allocation bit field indexing at least a subset of the second timing parameter table, wherein a size of the resource allocation bit field is based at least in part on a configuration of the first BWP;
    identifying a value for the timing parameter based at least in part on the second timing parameter table and the size of the resource allocation bit field; and
    communicating with the base station over the second BWP in accordance with the value for the timing parameter.

2. The method of claim 1, wherein the size of the resource allocation bit field is based at least in part on a number of rows in the first plurality of rows.

3. The method of claim 1, wherein the first plurality of rows comprises more rows than the second plurality of rows, and wherein identifying the value for the timing parameter comprises:
    identifying a subset of bits in the resource allocation bit field, the subset of bits indexing a row of the second plurality of rows; and
    determining the value for the timing parameter based on the indexed row of the second plurality of rows.

4. The method of claim 1, wherein the first plurality of rows comprises fewer rows than the second plurality of rows, and wherein identifying the value for the timing parameter comprises:
    identifying a subset of the second plurality of rows that are addressable by the resource allocation bit field;
    identifying a row of the subset of the second plurality of rows indexed by the resource allocation bit field; and
    determining the value for the timing parameter based on the indexed row.

5. The method of claim 4, wherein the subset of the second plurality of rows comprises a lowest-indexed row of the second plurality of rows, the lowest-indexed row corresponding to a preferred value of the timing parameter for switching to the second BWP.

6. The method of claim 4, wherein the subset of the second plurality of rows comprises a largest value of the potential values for the timing parameter from the second plurality of rows.

7. The method of claim 4, wherein the subset of the second plurality of rows comprises at least one row corresponding to a preferred value of the timing parameter for communicating in the second BWP.

8. The method of claim 7, wherein the preferred value of the timing parameter comprises a first value for wakeup communications, a second value for data communications, or a third value for micro-sleep communications.

9. The method of claim 1, wherein the first timing parameter table is associated with uplink transmissions over the first BWP, the plurality of timing parameter tables further comprising a third timing parameter table associated with downlink transmissions over the first BWP.

10. The method of claim 1, wherein the first BWP has a first tone spacing and the second BWP has a second tone spacing, and wherein the potential values for the timing parameter of the first timing parameter table are based at least in part on the first tone spacing, and the potential values for the timing parameter of the second timing parameter table are based at least in part on the second tone spacing.

11. The method of claim 1, further comprising:
    adjusting a minimum value of the timing parameter, based at least in part on switching communications from the first BWP to the second BWP.

12. The method of claim 1, wherein identifying the plurality of timing parameter tables comprises:
receiving at least one of the plurality of timing parameter tables from the base station via radio resource control (RRC) signaling.

13. The method of claim 1, further comprising:
identifying a format for the DCI transmission; and
selecting the second timing parameter table from the plurality of timing parameter tables based at least in part on the format of the DCI transmission.

14. The method of claim 1, wherein the DCI transmission comprises a BWP identification field that activates the second BWP.

15. The method of claim 1, wherein the first BWP is associated with a lower transmission power than the second BWP.

16. A method for wireless communication, comprising:
identifying a plurality of timing parameter tables that each define one or more potential values for a timing parameter associated with a timing between transmission, to a user equipment (UE), of downlink control information (DCI) and a subsequent communication with the UE according to the DCI, the plurality of timing parameter tables comprising at least a first timing parameter table associated with a first bandwidth part (BWP) and a second timing parameter table associated with a second BWP,
wherein the first timing parameter table comprises a first plurality of rows and the second timing parameter table comprises a second plurality of rows, each row of the first plurality of rows and the second plurality of rows indicating a potential value for the timing parameter;
selecting a value for the timing parameter based at least in part on second timing parameter table;
transmitting, over the first BWP, a DCI transmission that activates the second BWP, the DCI transmission comprising a resource allocation bit field indicating the value for the timing parameter, wherein a size of the resource allocation bit field is based at least in part on a configuration of the first BWP; and
communicating with the UE over the second BWP in accordance with the value for the timing parameter.

17. The method of claim 16, wherein the size of the resource allocation bit field is based at least in part on a number of rows in the first plurality of rows.

18. The method of claim 16, wherein the first plurality of rows comprises more rows than the second plurality of rows, and wherein transmitting the DCI transmission comprises:
zero-padding the resource allocation bit field.

19. The method of claim 16, wherein the first plurality of rows comprises fewer rows than the second plurality of rows, and wherein selecting the value for the timing parameter comprises:
identifying a subset of the second plurality of rows that are addressable by the resource allocation bit field; and
selecting the value for the timing parameter based at least in part on the subset of the second plurality of rows.

20. The method of claim 19, wherein the subset of the second plurality of rows comprises a lowest-indexed row of the second plurality of rows, the lowest-indexed row corresponding to a preferred value of the timing parameter for switching to the second BWP.

21. The method of claim 19, wherein the subset of the second plurality of rows comprises a largest value of the potential values for the timing parameter from the second plurality of rows.

22. The method of claim 19, wherein the subset of the second plurality of rows comprises at least one row corresponding to a preferred value of the timing parameter for communicating in the second BWP.

23. The method of claim 22, wherein the preferred value of the timing parameter comprises a first value for wakeup communications, a second value for data communications, or a third value for micro-sleep communications.

24. The method of claim 16, wherein the first timing parameter table is associated with uplink transmissions over the first BWP, the plurality of timing parameter tables further comprising a third timing parameter table associated with downlink transmissions over the first BWP.

25. The method of claim 16, wherein the first BWP has a first tone spacing and the second BWP has a second tone spacing, and wherein the potential values for the timing parameter of the first timing parameter table are based at least in part on the first tone spacing, and the potential values for the timing parameter of the second timing parameter table are based at least in part on the second tone spacing.

26. The method of claim 16, further comprising: adjusting a minimum value of the timing parameter, based at least in part on switching communications from the first BWP to the second BWP.

27. The method of claim 16, further comprising:
transmitting at least one of the plurality of timing parameter tables to the UE via radio resource control (RRC) signaling.

28. The method of claim 16, further comprising:
identifying a trigger for switching communications with the UE from the first BWP to the second BWP; and
identifying a format for the DCI transmission based at least in part on the trigger.

29. The method of claim 16, wherein the DCI transmission comprises a BWP identification field that activates the second BWP.

30. The method of claim 16, wherein the first BWP is associated with a lower transmission power than the second BWP.

31. An apparatus for wireless communication, comprising:
a processor,
memory coupled with the processor; and
instructions stored in the memory and executable by the processor to cause the apparatus to:
identify a plurality of timing parameter tables that each define one or more potential values for a timing parameter associated with a timing between receipt, from a base station, of downlink control information (DCI) and a subsequent communication with the base station according to the DCI, the plurality of timing parameter tables comprising at least a first timing parameter table associated with a first bandwidth part (BWP) and a second timing parameter table associated with a second BWP,
wherein the first timing parameter table comprises a first plurality of rows and the second timing parameter table comprises a second plurality of rows, each row of the first plurality of rows and the second plurality of rows indicating a potential value for the timing parameter;
receive, over the first BWP, a DCI transmission that activates the second BWP, the DCI transmission comprising a resource allocation bit field indexing at least a subset of the second timing parameter table, wherein a size of the resource allocation bit field is based at least in part on a configuration the first BWP;

identify a value for the timing parameter based at least in part on the second timing parameter table and the size of the resource allocation bit field; and communicate with the base station over the second BWP in accordance with the value for the timing parameter.

32. The apparatus of claim 31, wherein the size of the resource allocation bit field is based at least in part on a number of rows in the first plurality of rows.

33. The apparatus of claim 31, wherein the first plurality of rows comprises more rows than the second plurality of rows, and comprises:

identify a subset of bits in the resource allocation bit field, the subset of bits indexing a row of the second plurality of rows; and determine the value for the timing parameter based on the indexed row of the second plurality of rows.

34. The apparatus of claim 31, wherein the first plurality of rows comprises fewer rows than the second plurality of rows, and comprises:

identify a subset of the second plurality of rows that are addressable by the resource allocation bit field;

identify a row of the subset of the second plurality of rows indexed by the resource allocation bit field; and determine the value for the timing parameter based on the indexed row.

35. The apparatus of claim 34, wherein the subset of the second plurality of rows comprises a lowest-indexed row of the second plurality of rows, the lowest-indexed row corresponding to a preferred value of the timing parameter for switching to the second BWP.

36. An apparatus for wireless communication, comprising:

a processor, memory coupled with the processor; and instructions stored in the memory and executable by the processor to cause the apparatus to:

identify a plurality of timing parameter tables that each define one or more potential values for a timing parameter associated with a timing between transmission, to a user equipment (UE), of downlink control information (DCI) and a subsequent communication with the UE according to the DCI, the plurality of timing parameter tables comprising at least a first timing parameter table associated with a first bandwidth part (BWP) and a second timing parameter table associated with a second BWP, wherein the first timing parameter table comprises a first plurality of rows and the second timing parameter table comprises a second plurality of rows, each row of the first plurality of rows and the second plurality of rows indicating a potential value for the timing parameter;

select a value for the timing parameter based at least in part on the second timing parameter table;

transmit, over the first BWP, a DCI transmission that activates the second BWP, the DCI transmission comprising a resource allocation bit field indicating the value for the timing parameter, wherein a size of the resource allocation bit field is based at least in part on a configuration of the first BWP; and communicate with the UE over the second BWP in accordance with the value for the timing parameter.

37. The apparatus of claim 36, wherein the size of the resource allocation bit field is based at least in part on a number of rows in the first plurality of rows.

38. The apparatus of claim 36, wherein the first plurality of rows comprises more rows than the second plurality of rows, and comprises:

zero-pad the resource allocation bit field.

39. The apparatus of claim 36, wherein the first plurality of rows comprises fewer rows than the second plurality of rows, and comprises:

identify a subset of the second plurality of rows that are addressable by the resource allocation bit field; and select the value for the timing parameter based at least in part on the subset of the second plurality of rows.

40. The apparatus of claim 39, wherein the subset of the second plurality of rows comprises a lowest-indexed row of the second plurality of rows, the lowest-indexed row corresponding to a preferred value of the timing parameter for switching to the second BWP.

* * * * *